(12) United States Patent
Carter

(10) Patent No.: US 10,353,983 B2
(45) Date of Patent: Jul. 16, 2019

(54) TEMPERATURE CONTROLLED SYSTEMS

(71) Applicant: PassivSystems Limited, Newbury, Berkshire (GB)

(72) Inventor: Edwin Carter, Berkshire (GB)

(73) Assignee: PassivSystems Limited, Newbury (GB)

( * ) Notice: Subject to any disclaimer, the term of this patent is extended or adjusted under 35 U.S.C. 154(b) by 133 days.

(21) Appl. No.: 15/036,702

(22) PCT Filed: Nov. 11, 2014

(86) PCT No.: PCT/GB2014/053345
§ 371 (c)(1),
(2) Date: May 13, 2016

(87) PCT Pub. No.: WO2015/071654
PCT Pub. Date: May 21, 2015

(65) Prior Publication Data
US 2016/0356515 A1    Dec. 8, 2016

(30) Foreign Application Priority Data
Nov. 14, 2013   (GB) .................................. 1320134.8

(51) Int. Cl.
*G06F 17/16* (2006.01)
*G05D 23/19* (2006.01)
(Continued)

(52) U.S. Cl.
CPC .............. *G06F 17/16* (2013.01); *F24F 11/30* (2018.01); *F24F 11/62* (2018.01); *G05B 13/048* (2013.01);
(Continued)

(58) Field of Classification Search
None
See application file for complete search history.

(56) References Cited

U.S. PATENT DOCUMENTS

| 5,197,666 A * | 3/1993 | Wedekind ................ F24F 11/00 236/46 R |
| 2010/0010679 A1 * | 1/2010 | Kassel ............... G05D 23/1931 700/278 |
| 2010/0059598 A1 | 3/2010 | Lindgren et al. |
| 2010/0096467 A1 | 4/2010 | Kim |

(Continued)

FOREIGN PATENT DOCUMENTS

| GB | 2448896 A | 11/2008 |
| WO | WO 2013/005027 A2 | 1/2013 |
| WO | WO 2013/171448 A1 | 11/2013 |

OTHER PUBLICATIONS

Doucet et al., A Tutorial on Particle Filtering and Smoothing: Fifteen years later, version 1.1, Dec. 2008 with typographical corrections Mar. 2012.

(Continued)

*Primary Examiner* — Cory W Eskridge
(74) *Attorney, Agent, or Firm* — Dascenzo Intellectual Property Law, P.C.

(57) ABSTRACT

In a method of apparatus for obtaining thermal property data on thermal properties of a temperature controlled system which includes temperature control apparatus, said data being suitable for use in predicting the temperature of at least part of the system, the following steps are performed: (a) the monitoring the temperature of at least part of the system over a succession of portions or points of a data acquisition period and recording said temperature for each portion or point in an electronic memory; (b) the determining heat transfer data for the period, said heat transfer data being indicative of the amount of heat energy supplied to, or removed from said part over the acquisition period; and determining the thermal property data from the recorded temperatures and heat transfer data, wherein the thermal property data is determined by a process of statistical inference.

19 Claims, 19 Drawing Sheets

(51) Int. Cl.
  *G05B 13/04* (2006.01)
  *G06N 7/00* (2006.01)
  *F24F 11/30* (2018.01)
  *F24F 11/62* (2018.01)
  *F24F 110/10* (2018.01)
  *F24F 140/50* (2018.01)
  *F24F 140/60* (2018.01)
  *F24F 11/64* (2018.01)
  *F24F 11/56* (2018.01)
  *F24F 11/52* (2018.01)

(52) U.S. Cl.
  CPC ......... *G05D 23/1917* (2013.01); *G06N 7/005* (2013.01); *F24F 11/52* (2018.01); *F24F 11/56* (2018.01); *F24F 11/64* (2018.01); *F24F 2110/10* (2018.01); *F24F 2140/50* (2018.01); *F24F 2140/60* (2018.01)

(56) References Cited

U.S. PATENT DOCUMENTS

| 2011/0224947 | A1  | 9/2011  | Kriss |
| 2012/0065783 | A1* | 3/2012  | Fadell ............. F24F 11/006 700/276 |
| 2012/0330465 | A1* | 12/2012 | O'Neill ............. G05B 17/02 700/276 |
| 2013/0085614 | A1* | 4/2013  | Wenzel ............. G05D 23/1923 700/277 |

OTHER PUBLICATIONS

Huval, B., Optimization of a Heating System Using Smart Meters & Dynamic Pricing, Honors Thesis, University of Florida.

Search Report issued in connection with United Kingdom Patent Application No. GB 1320134.8, 1 page, United Kingdom Intellectual Property Office, dated Jul. 3, 2014.

* cited by examiner

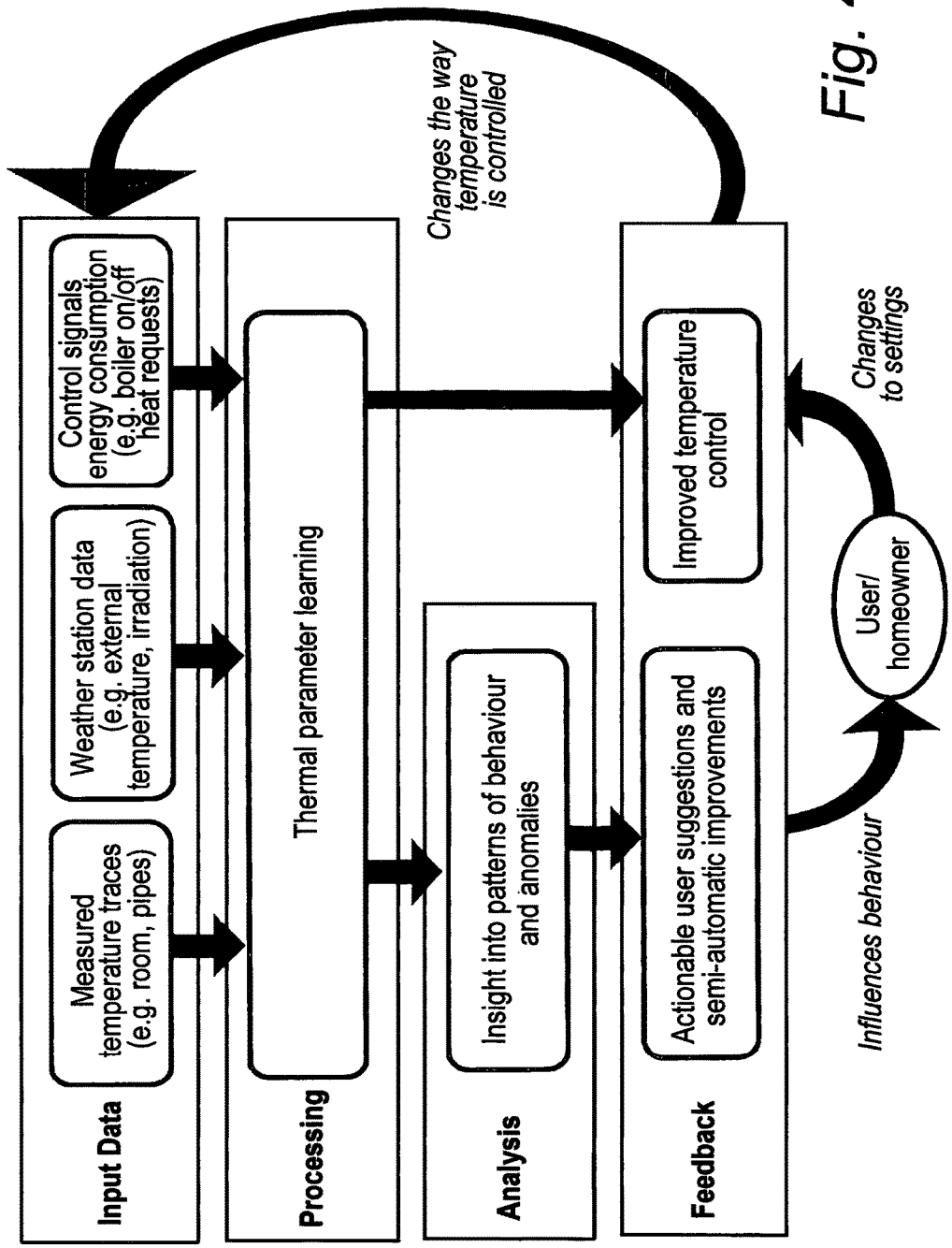

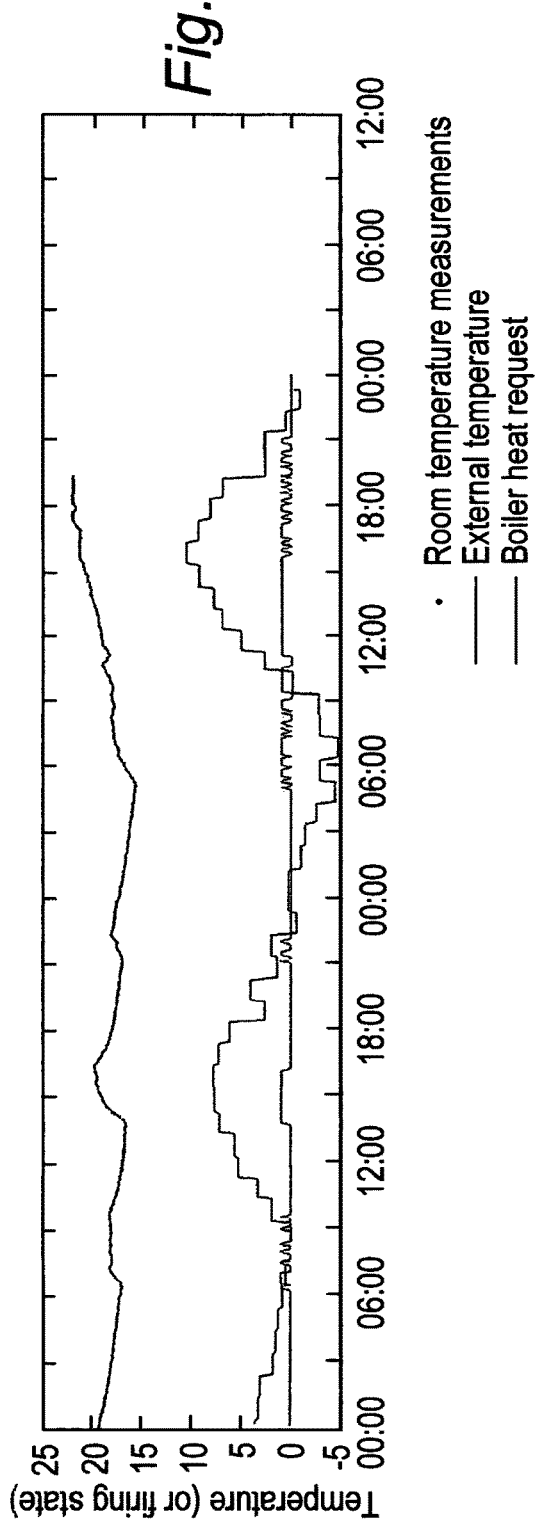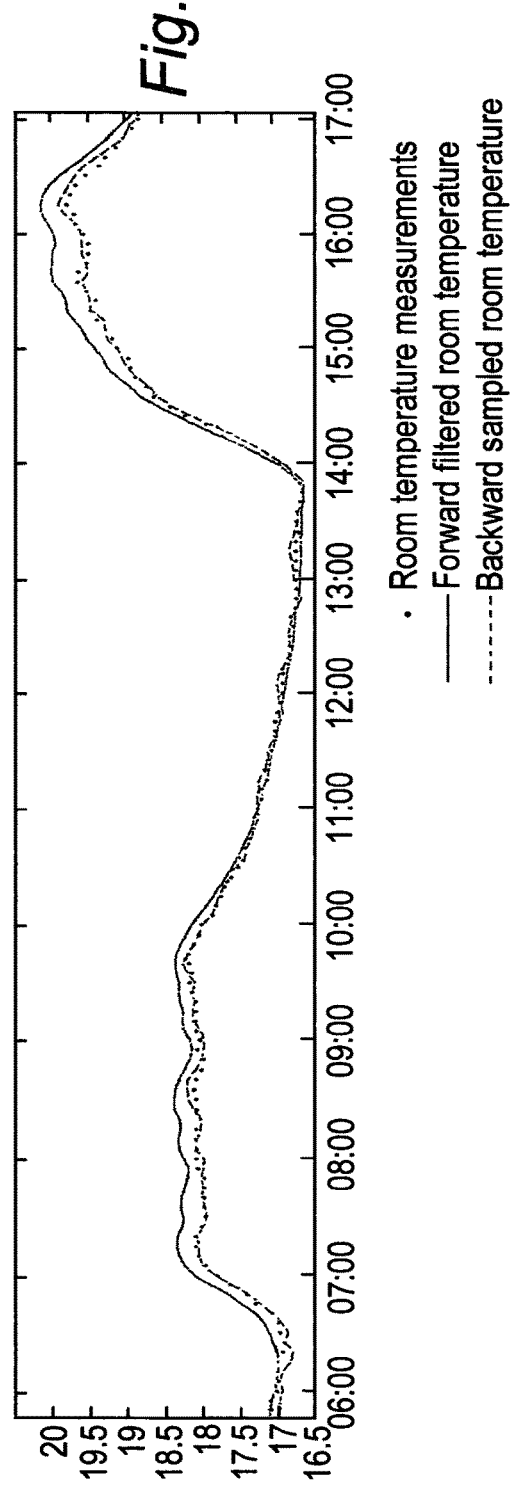

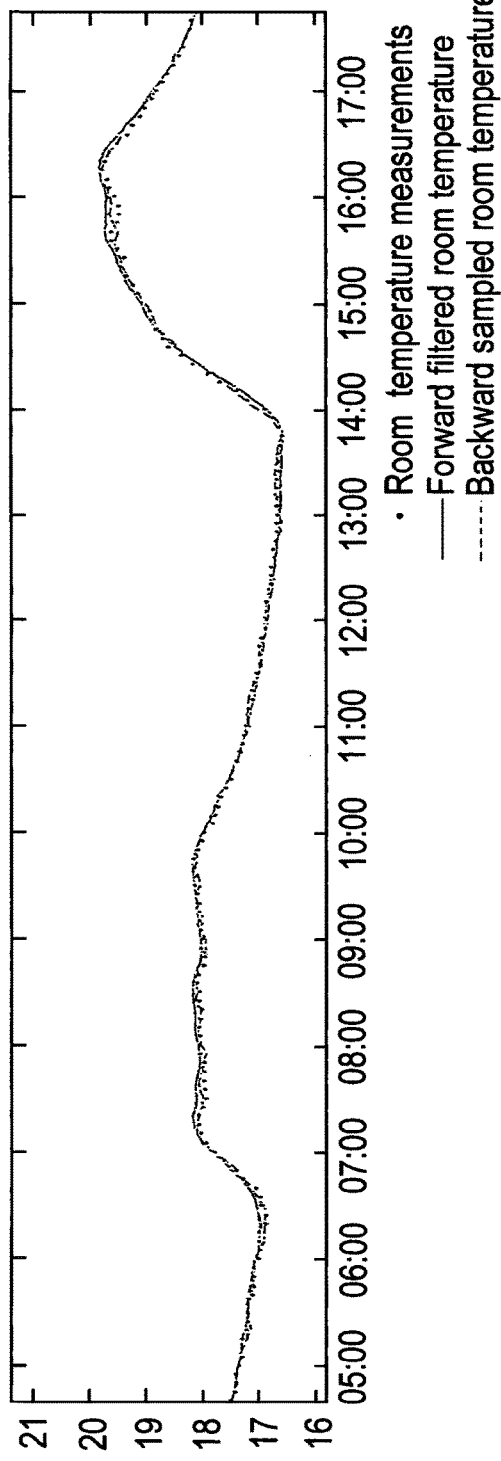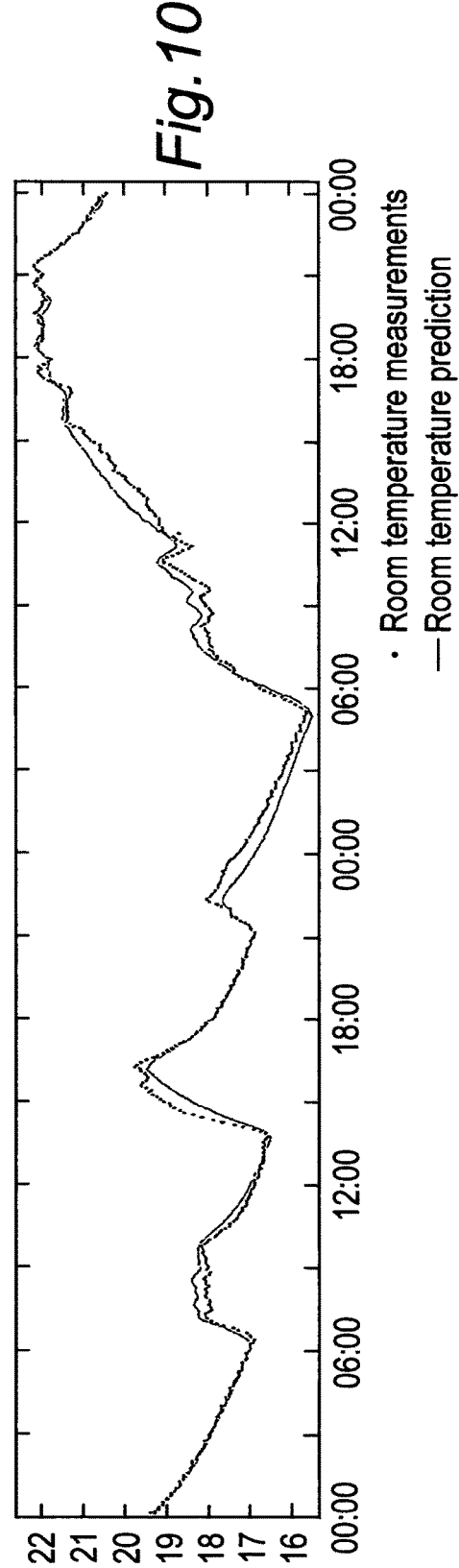

Worked example of thermal parameter learning algorithm
(one iterative step)

r    Initial guess for thermal parameter vector (model matches Eqn 2)
(transposed)    0.05    0.05    0.04    2    0.18    150

Ad    Model evolution matrix (continuous form)

| | | | Bd | | Fd |
|---|---|---|---|---|---|
| −0.14 | 0.05 | 0.04 | 0 | | 0.05 |
| 2 | −2 | 0 | 150 | | 0 |
| 0.18 | 0 | −0.18 | 0 | | 0 |

H    Measurement matrix

| 1 | 0 | 0 |
|---|---|---|

Δt = 0.25    Time step (hours) = 15 minute step
A    Model evolution matrix (discrete form). In this scenario, A_k is the same for all k

| 0.965 | 0.0125 | 0.01 |
|---|---|---|
| 0.5 | 0.5 | 0 |
| 0.045 | 0 | 0.955 |

Input buffer
n=33    Number of time points in input buffer
    For reference. Not used in the calculations k    32 → 1    2    3    4    5    6    7    8    9    10    11
Time    33 → 00:14    00:29    00:44    00:59    01:14    01:29    01:44    01:59    02:14    02:29    02:44
    Measurement vector. In this case we are just measuring room temperature
y    34 → 17.6    17.5    17.4    17.3    17.4    17.2    17.1    17    17    17    17.3
    External influence vector. In this case we are using an internet feed for the external temperature
T_E    35 → 1.5    1.2    1.2    1.2    0.8    0.8    0.8    0.8    0.8    0.5    0.5
    Control signal vector. In this case we are using the heat request to the boiler, as sent by the control system
P    36 → 0    0    0    0    0    0    0    0    0    1    1

Forward filtering
    Guess for first mean value of the hidden state vector (using measured room temperature)

*Note there is no E1 or B1 because the first step is from k=1 to k=2*
E2    Inferred energy input for first step. P=0 therefore E=0
      0

B2    Calculated energy influence matrix B for the first time step, using inferred E
      0.015
      0
      0

Kalman filter parameters
Initial guess for the covariance matrix          Process noise matrix          Measurement noise
0.01    0       0                                 0.0205   0      0             0.01
0       1.56    0                                 0        5.68   0
0       0       6.25                              0        0      0.00227

Following through the Kalman filter equations
Predicted state           Predicted estimate covariance              Innovation covariance    Kalman gain
17.39                     0.0266    0.0125    0.0599                 0.0366                   0.726
17.6                      0.0125    6.07      0.000127                                        0.341
17.6                      0.0599    0.000127  5.7                                             1.64

Kalman-filtered hidden state X          Updated covariance matrix
17.47                                   0.00726   0.00341   0.0164
17.64                                   0.00341   6.07     -0.0203
17.77                                   0.0164   -0.0203    5.6

S2    Scale matrix (inverse of the updated covariance matrix)
      139       -0.0793   -0.406
      -0.0793    0.165     0.00083
      -0.406     0.00083   0.18

*Repeating this process for each timestep, we calculate* k      1      2      3      4      5      6      7      8      9      10     11
Time   00:14  00:29  00:44  00:59  01:14  01:29  01:44  01:59  02:14  02:29  02:44
E  ──  0      0      0      0      0      0      0      0      1      1      0

Inferred energy input to the house model.    Note that at timestep k=11, it differs from the heat request P.

Mean of the hidden state distribution after each timestep.
Note that the water temperature, the second element, goes up to 70 C μ ──  17.6   17.47  17.37  17.31  17.25  17.17  17.07  16.99  16.95  17.04  17.36

FIG. 11B

```
         17.6    17.64   17.7    17.76   17.79   17.71   17.61   17.53   55.03   73.1    44.71
41 →
42 →     17.6    17.77   18      18.24   18.45   18.56   18.63   18.7    18.79   18.49   18.24
         Scale matrix for a few timesteps
48 →            136    -0.214  -0.481 |S4         135    -0.254  -0.492           135    -0.267
S3  49 →       -0.214   0.14    0.00292          -0.254  0.136   0.00436  ...S32  -0.267  0.134
    50 →       -0.481   0.00292 0.202            -0.492  0.00436 0.226            -0.523  0.00611
```

Backwards sampling
The inputs to the backward sampling process are the sets of E, μ and S above.
We start by sampling the hidden state for the last timestep, according to the multivariate
Gaussian defined by μ33 and S33
Sampled hidden state

```
X33     16.72
        12.81
        16.82
        We then calculate the scale matrix for Eqn 7                And the mean for the distribution
               182     0.366   18.9                                 in Eqn 7 (which uses B33)
               0.366   0.186   0.0122                                       16.9
               18.9    0.0122  405                                          18
                                                                            17.1
        And now we sample the next (going backwards in time) hidden state, according to the
        multivariate Gaussian defined by the above quantities
X32     16.88
         9.76
        16.86
        And repeat all the way back to k=1
        So the output of backwards sampling is the following set of sampled hidden states:
k       →   1      2      3      4      5      6      7      8      9      10     11
Time    → 00:14  00:29  00:44  00:59  01:14  01:29  01:44  01:59  02:14  02:29  02:44
        Sampled hidden state
45 →     17.6   17.42  17.42  17.33  17.22  17.15  17.07  17.04  16.95  16.95  17.4
X  46 → 18.48  18.41  20.29  21.58  13.28  18.12  19.73  22.34  58.95  77.53  47.29
47 →    15.35  15.52  15.65  15.7   15.76  15.77  15.79  15.84  15.87  15.92  15.92
        Note that random numbers are used to generate X so these numbers will not be reproduceable.                 FIG. 11C
```

Sampling thermal parameters given sampled hidden state

D1
| 0.885 | 0 | 0 | -16.4 | 0 | 0 |
| -2.25 | 0 | 0 | 0 | -0.885 | 0 |
| 0 | 0 | 2.25 | 0 | 0 | 0 |

First DQD term added up to make U
| 2.3925 | -44.275 | -6.105 | 0 | 0 | 0 |
| -44.275 | 822.25 | 113.025 | 0 | 0 | 0 |
| -6.105 | 113.025 | 15.5375 | 0 | 0 | 0 |
| 0 | 0 | 0 | 0.0086075 | 0 | 0 |
| 0 | 0 | 0 | 0 | 139.7 | 0 |
| 0 | 0 | 0 | 0 | 0 | 0 |

First term added up to make rho
| -1.9415 | 36.025 | 4.95 | 0.00286 | 43.45 | 0 |

After adding up 33 elements
Likelihood scale matrix for r

U
| 74700 | -29600 | -2530 | 0 | 0 | 0 |
| -29600 | 25100 | 2010 | 0 | 0 | 0 |
| -2530 | 2010 | 179 | 0 | 0 | 0 |
| 0 | 0 | 0 | 269 | 0 | 0 |
| 0 | 0 | 0 | 0 | 1620 | -2.48 |
| 0 | 0 | 0 | -2.48 | 0 | 0.088 |

Likelihood mean for r (transposed)

ρ
| 0.0269 | 0.0302 | 0.0869 | 2.04 | 0.17 | 144 |

Rejection sampling of r from posterior distribution
Gamma prior for r

| | | | | | |
|---|---|---|---|---|---|
| Shape (m) | 4 | 4 | 2 | 4 | 2 | 4 |
| Scale (θ) | 0.0167 | 0.0167 | 0.04 | 0.667 | 0.18 | 50 |

FIG. 11D

| | | | | | | |
|---|---|---|---|---|---|---|
| Mode of distribution | | | | | | |
| v | 0.0285 | 0.0367 | 0.0391 | 2.04 | 0.17 | 144 |
| Mean of proposal distribution (in this case, virtually identical to mode) | | | | | | |
| | 0.0285 | 0.0367 | 0.0391 | 2.04 | 0.17 | 144 |
| Samples from proposal distribution: | | | | | | |
| | 0.0323 | 0.0499 | -0.0235 | 2.02 | 0.185 | 144 Rejected because of negative element |
| | 0.0309 | 0.0596 | -0.136 | 2.15 | 0.14 | 150 Rejected because of negative element |
| ... | | | | | | |
| | 0.0287 | 0.0225 | 0.349 | 2.06 | 0.18 | 147 (5$^{th}$ iteration) |
| a | 0.0023 Random number u = 0.0043 => Rejected | | | | | |
| ... | | | | | | |
| First accepted sample -- updated r | | | | | | |
| r | 0.0268 | 0.0243 | 0.17 | 2.08 | 0.14 | 149 (9$^{th}$ iteration) |

FIG. 11E

| 32→ | 12 | 13 | 14 | 15 | 16 | 17 | 18 | 19 | 20 | 21 | 22 | 23 |
|---|---|---|---|---|---|---|---|---|---|---|---|---|
| 33→ | 02:59 | 03:14 | 03:29 | 03:44 | 03:59 | 04:14 | 04:29 | 04:44 | 04:59 | 05:14 | 05:29 | 05:44 |
| 34→ | 17.8 | 18.1 | 18 | 18 | 18.1 | 18.1 | 18.1 | 18 | 18 | 18.1 | 18.2 | 18.2 |
| 35→ | 0.5 | 0.5 | 0.2 | 0.2 | 0.2 | 0.2 | -0.1 | -0.1 | -0.1 | -0.1 | 1.9 | 1.9 |
| 36→ | 1 | 0 | 1 | 0 | 1 | 1 | 0 | 0 | 1 | 1 | 1 | 0 |

FIG. 11F

| | 12 | 13 | 14 | 15 | 16 | 17 | 18 | 19 | 20 | 21 | 22 | 23 |
|---|---|---|---|---|---|---|---|---|---|---|---|---|
| 37 | | | | | | | | | | | | |
| 38 | 02:59 | 03:14 | 03:29 | 03:44 | 03:59 | 04:14 | 04:29 | 04:44 | 04:59 | 05:14 | 05:29 | 05:44 |
| 39 | 1 | 0 | 1 | 0 | 1 | 1 | 0 | 0 | 1 | 1 | 0 | 0 |
| 40 | 17.73 | 18.11 | 18.02 | 18.1 | 18.11 | 18.2 | 18.25 | 18.11 | 18.05 | 18.16 | 18.3 | 18.26 |

FIG. 11G

| | 24 | 25 | 26 | 27 | 28 | 29 | 30 | 31 | 32 | 33 |
|---|---|---|---|---|---|---|---|---|---|---|
| 32→ | | | | | | | | | | |
| 33→ | 05:59 | 06:14 | 06:29 | 06:44 | 06:59 | 07:14 | 07:29 | 07:44 | 07:59 | 08:14 |
| 34→ | 18 | 17.8 | 17.5 | 17.4 | 17.2 | 17.1 | 17.1 | 17 | 16.9 | 16.8 |
| 35→ | 1.9 | 1.9 | 3.4 | 3.4 | 3.4 | 3.4 | 5.3 | 5.3 | 5.3 | 5.3 |
| 36→ | 0 | 0 | 0 | 0 | 0 | 0 | 0 | 0 | 0 | 0 |

FIG. 11I

|  | 24 | 25 | 26 | 27 | 28 | 29 | 30 | 31 | 32 | 33 |
|---|---|---|---|---|---|---|---|---|---|---|
| 37 →  |  |  |  |  |  |  |  |  |  |  |
| 38 → | 05:59 | 06:14 | 06:29 | 06:44 | 06:59 | 07:14 | 07:29 | 07:44 | 07:59 | 08:14 |
| 39 → | 0 | 0 | 0 | 0 | 0 | 0 | 0 | 0 | 0 | 0 |
| 40 → | 18.06 | 17.8 | 17.55 | 17.36 | 17.24 | 17.11 | 17.03 | 16.97 | 16.88 | 16.8 |

FIG. 11J

TEMPERATURE CONTROLLED SYSTEMS

FIELD OF THE INVENTION

This invention relates to apparatus for and a method of obtaining thermal property data on thermal properties of a temperature controlled system, to a controller for a temperature management system and to a temperature management system having such a controller.

BACKGROUND TO THE INVENTION

The invention is particularly, but not exclusively, applicable to the control of a heating and/or cooling system, such as a central heating system or air conditioning system for the home or office. It is still the case that most domestic space heating systems control temperature by targeting a set point temperature (which may form part of a schedule of such temperatures that vary over a control period) and using a thermostat with hysteresis to turn the heat source on and off. This type of control is based only on the current state of the house and its heating system, and does not take into account any forward planning or knowledge of the thermal response of the house.

Consequently, the known method can fail to achieve energy efficiency and/or the best comfort for the occupants of the house, and provides the occupants practically no insight into the thermal performance of the house and the heating/cooling system, for example the rate of heat loss from the house to the external environment and the energy input to the heating/cooling system that will be required in order to achieve a desired temperature change within the house. These drawbacks are particularly pertinent to the control of a heat pump-based heating or cooling system.

There are existing systems which remotely measure room temperature and enable the home owner to view the recorded temperature traces by an internet page, but the services rarely provide any additional insight. Some existing services do provide some analysis (see for example https://www.myjoulo.com/) but not to the extent of taking into account the thermal properties of the house.

It has been proposed to control temperature within a building using a system in which the effect of an energy input into the building's heating or air conditioning system on temperature is predicted using data on the thermal characteristics of the building and on external conditions. In the paper "Optimization of a Heating System using Smart Meters and Dynamic Pricing" (Huval. XP002696078) it is proposed to determine a schedule for the heat to be supplied by a heating system by determining a control schedule of a hot water supply valve (that controls the supply of hot water to a heater) in order to minimise a cost function comprising the sum of the cost of heating the building and the cost of "loss of comfort". However, the document does not discuss how the building thermal parameters, necessary for the predictive model, are determined and indeed indicates that it would be problematic for an individual household to find the necessary coefficients in order to set up an accurate model.

Certain control systems incorporate "optimum start" facilities, whereby the rate of increase of temperature with time is learned when the house is being heated up, and this gradient value is then used to subsequently calculate when to start heating in order for the house to get to a particular temperature at a particular time, and can thus perform a more accurate optimum start time calculation. Other systems learn simple characteristics in order to reduce heating system "undershoot" and "overshoot", as a result of the hysteresis mentioned above (e.g. U.S. 2010/0096467). However, the systems cannot predict the thermal response of a house particularly accurately, especially where the temperatures of the house do not change significantly over time, for example the house heated by an underfloor heating system or a heat pump.

SUMMARY OF THE INVENTION

According to a first aspect of the invention, there is provided a method of obtaining thermal property data on thermal properties of a temperature controlled system which includes temperature control apparatus, said data being suitable for use in predicting the temperature of at least part of the system, the method comprising the steps of:
(a) monitoring the temperature of at least part of the system over a succession of portions of a data acquisition period and recording said temperature for each portion in an electronic memory;
(b) determining heat supply/removal data for the period, said heat supply/removal data being indicative of the amount of heat energy supplied to, or removed from said part by the temperature control apparatus over the period; and
(c) determining the thermal property data from the recorded temperatures and heat transfer data, wherein the thermal property data are determined by a process of statistical inference.

Preferably, said process of statistical inference comprises the steps of:
(d) sampling a set of possible thermal property data;
(e) determining a likelihood value, indicative of the probability of the selected data being consistent with recorded temperatures; and
(f) repeating steps (d) and (e) for other, iteratively selected samples of possible thermal property data.

Conveniently, said steps (d) and (e) are repeated a predetermined number of times, the final sample constituting said thermal property data.

The statistical inference process enables the thermal property data to be sufficiently accurate for the associated thermal parameters of the temperature controlled system to be determined, if desired. This information can provide a useful insight into the thermal performance of the system, for example predicted heating and cooling rates of the system in various circumstances, the energy required by the temperature control apparatus to ensure the system conforms to a required temperature or schedule of set point temperatures or the amount of heat energy transferred between the temperature control system and the external environment. The acquisition of thermal property data does not necessarily require any alteration of the operation of the temperature control apparatus, nor a change of temperature of the temperature controlled system.

The thermal property data can be used in the control of the temperature control apparatus, by being fed into a thermal model for the temperature controlled system, from which the energy requirements needed for the temperature control apparatus to achieve a desired temperature of the temperature controlled system can be anticipated and this data can be used in determining an operating schedule for the temperature control apparatus.

The temperature controlled system may be any system that needs to have its temperature controlled over an extended period, for example, a domestic or commercial oven or laboratory incubator.

Preferably, however, the temperature controlled system comprises at least one room, for example in a domestic dwelling or an office of an office block, the temperature control apparatus comprising a heating and/or cooling system for the room.

In this case, the invention provides data that can be used to assess the thermal properties of a room or house (for example the efficacy of any insulation for the room or house) and/or can be used in optimising the performance of a heating/cooling system for the room, for example by the method described in the Huval paper mentioned above or the method described and claimed in the present applicant's PCT Patent Application No. PCT/GB2013/050376.

Preferably, the thermal properties, in respect of which said thermal property data are obtained, comprise any two or more thermal parameters, such as the heat capacities and thermal transfer properties of the room or of the heating and/or cooling system, the thermal transfer properties as between the room and the environment external to the room, or an arithmetic combination or function of said capacities and thermal transfer properties.

Preferably, said thermal properties further comprise the heat capacity and thermal transfer properties of the thermal mass of the room or a function of said properties, or arithmetic combination of the properties with one or more of the other thermal properties.

Preferably, the thermal capacity of the heating and/or cooling system is combined with heat energy supplied to or removed from the room and this combined quantity is part of the thermal property data determined by said process of statistical inference.

The process of statistical inference is preferably a process of Bayesian Inference.

Additionally or alternatively, the process may be a forward filtering backward sampling process.

Step (b) above, of determining the heat supply/removal data, may comprise monitoring control signals to the temperature control apparatus and calculating or estimating the heat supply/removal data from the data obtained by said monitoring.

Where the temperature control apparatus transfers heat with the room by means of a circulating heat transfer medium (for example water being pumped through radiators), the determining of the heat supply/removal data may additionally comprise determining the temperature(s) of the transfer medium at the output of the temperature control apparatus, by a process of statistical inference.

The invention is also applicable where the control signals to the temperature control apparatus are not known, in this case the determination of the heat supply/removal data being achieved by means of a statistical inference process, preferably a particle filter technique applied to the recorded temperatures.

The invention also lies in assessment apparatus for performing the aforesaid method.

More particularly, according to a second aspect of the invention, there is provided assessment apparatus for obtaining thermal property data on thermal properties of a temperature controlled system which includes temperature control apparatus, said data being suitable for use in predicting the temperature of at least part of the system, the assessment apparatus comprising at least one temperature sensor for monitoring the temperature of at least part of the system over a succession of portions of a data acquisition period, an electronic memory for storing said temperatures for each portion, a data processor arrangement operable to estimate heat supply/removal data for the period, said heat supply/removal data being indicative of the amount of heat energy supplied to or removed from said part by the temperature control apparatus during each portion, and to determine the thermal property data from the recorded temperatures and heat supply/removal data, wherein the data processor arrangement is operable to determine the thermal property data by a process of statistical inference.

According to a third aspect of the invention, there is provided a controller for a temperature management system for heating and/or cooling a room, comprising an output for control signals to the temperature management system and said assessment apparatus, wherein the electronic memory is arranged also to store said thermal property data and said data processor arrangement is also operable to calculate, for each portion of a control period, the heat energy to be transferred by the heating and/or cooling system for the temperature in the room to meet a given one or more conditions over the control period.

For example, the condition could be that the temperature conforms to a set point schedule over that period. Alternatively, the condition could be that the sum of the cost of supplying energy to the heating/cooling system and a parameter representative of a predetermined acceptability of variations from a set point temperature is minimised.

BRIEF DESCRIPTION OF THE DRAWINGS

The invention will now be described, by way of example only, with reference to the accompanying drawings in which—

FIG. 4 is a block diagram illustrating how the thermal property data obtained by "thermal parameter learning" can be used to assist in the automated control of the heating system and, optionally, to provide the user/home owner with insight to the thermal behaviour of the house (and/or recommendations for changes in the way the heating system for the house is controlled); and FIGS. 5 to 10 are graphs illustrating a data generated worked example of the method in accordance with the invention.

FIGS. 11A-11K represent a spreadsheet of a worked example of a thermal parameter learning algorithm.

DETAILED DESCRIPTION

Figure 1:
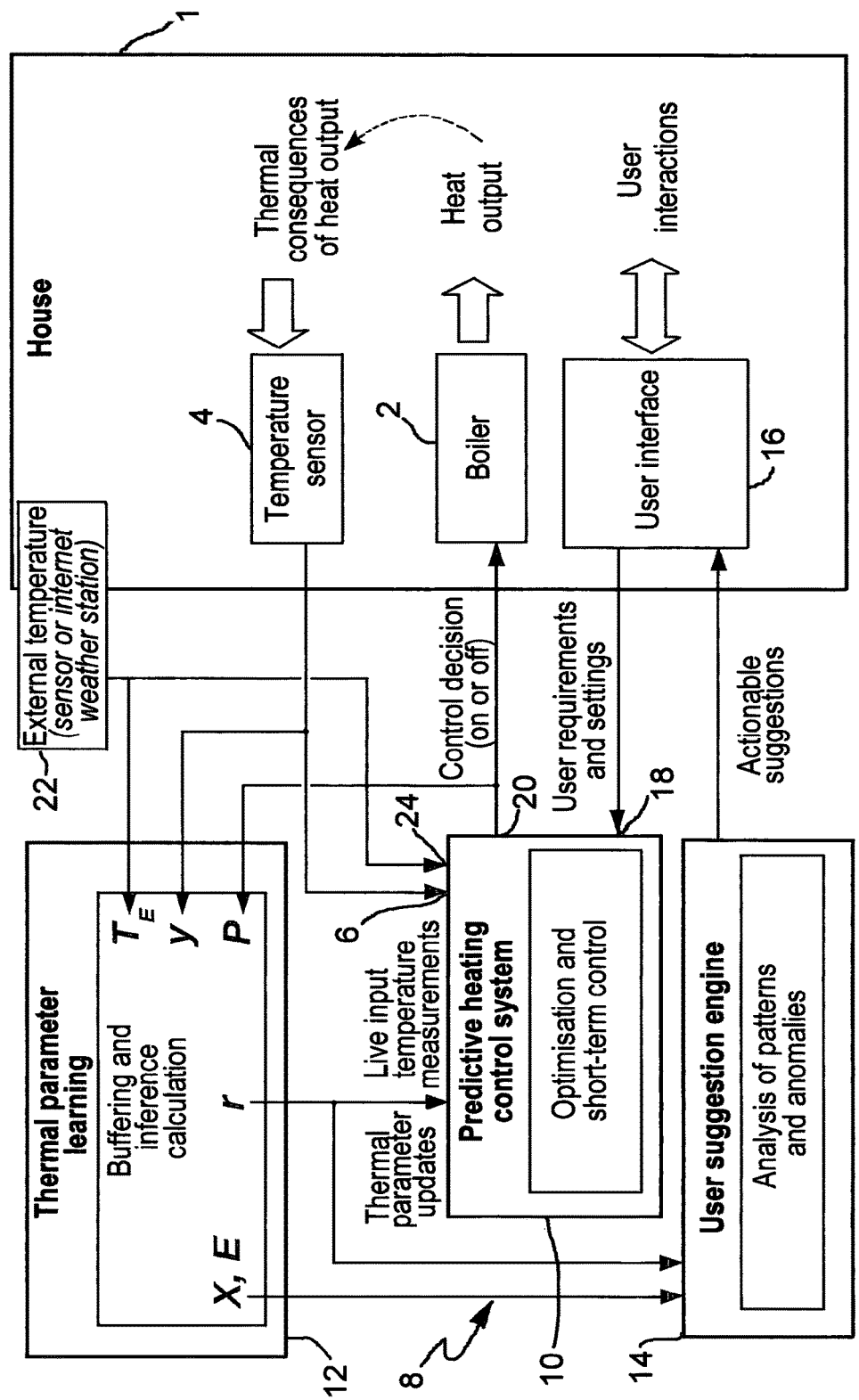
FIG. 1 is a functional block diagram illustrating the interaction between a controller in accordance with the invention and a house fitted with a heating system comprising a boiler which supplies hot water to radiators distributed throughout the house; the controller also incorporating assessment apparatus in accordance with the invention for conducting a method in accordance with the invention.

In FIG. 1 house 1 has one or more rooms (not shown) which are heated by a heating system comprising a boiler 2 linked to a heat delivery system (not shown) which in this example takes the form of a set of radiators through which water heated by the boiler 2 is circulated. It will be appreciated that other types of temperature management systems could be used, for example heat pump based heating and/or cooling systems or storage heaters.

A temperature sensor (or a respective sensor in each room) is denoted by the reference numeral 4, and monitors the temperature of the room in question. The output of the sensor is fed to an input 6 of a controller generally referenced 8. In FIG. 1, the controller 8 is represented as three functional blocks, a control block 10 for actually controlling the boiler 2, a thermal parameter learning block 12 for determining the thermal property data for the house 1 and a user suggestion engine block 14 for providing a home owner/user with information that provides an insight into the thermal performance of the house 1. The information from the block 14 is displayed to the user via a user interface 16 which may, for example, take the form of a computer terminal and/or touch screen. The interface 16 also enables the user to send command and settings information to a control input 18 of the controller 8.

An output 20 on the controller 8 provides control signals for the boiler 2, and these are fed to the input P of the thermal parameter learning block 12. Both the block 12 and the block 10 receive external temperature data from a suitable source 22, such as an external sensor or internet weather station. This data is indicated by the symbol $T_E$ in the block 12, whilst the input for the control block is denoted by the reference numeral 24. It can be seen that the learning block 12 also receives the data from the sensor(s) 4 at input y. It will be appreciated that other external data may be taken into account.

The thermal parameter learning block 12 uses a process of Bayesian Inference on the data fed to the block ($T_E$, y, P) to infer vectors X, E and r respectively representative of the hidden temperature state, energy input (from the boiler) and thermal parameters of the house 1.

The structure of the vectors X and r are described below.

As can be seen, the data in the vectors X, E can be processed by the suggestion engine 14 to provide the insight mentioned above, whilst the thermal parameters, arranged in the vector r are used for similar purposes by the engine 14, and are also used by the controller 10 to predict the quantitative effect of the operation of the boiler 2, in response to control signals, on the temperature(s) within house 1.

Modelling Approach

The described method infers detailed thermal characteristics of a house, such as time constants for heating and cooling, from measured temperature traces and optionally control signals. Our approach involves representing the house with a simple physics model, and then using Bayesian inference to deduce "backwards" the model parameters that have the best match to the measured data. The model can subsequently be used in the "forward" direction to predict temperature response, energy consumption etc. This predictive ability has a number of advantages (see description of example Applications in later sections).

We model the house as three or four thermal blocks, corresponding to the fabric of the house as well as elements of its heating system (such as radiators). The state of the house is a vector of temperatures x(t) at time t, with one vector component for each thermal block.

Figure 2:
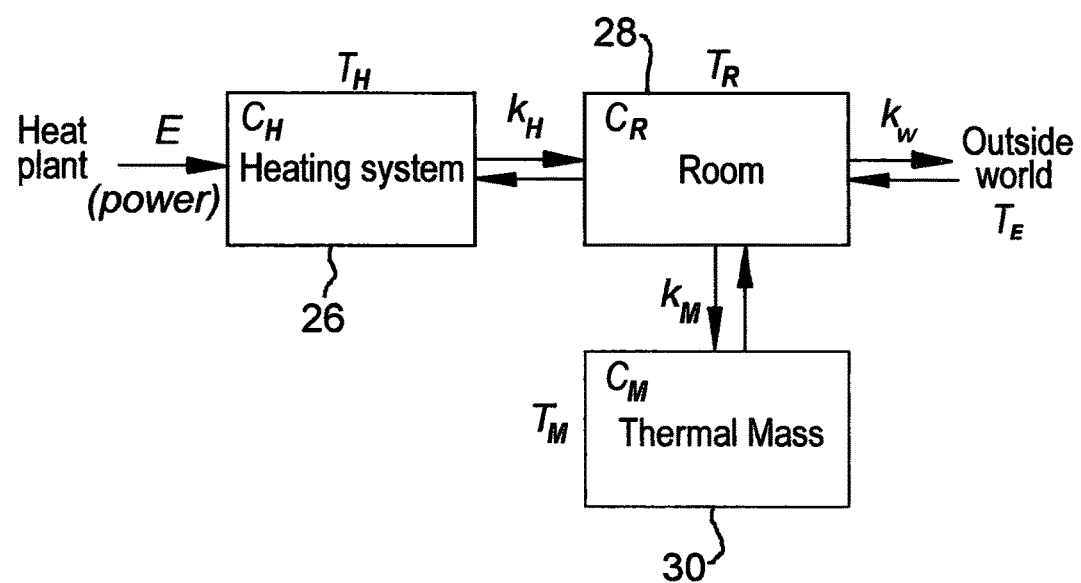
FIG. 2 is a block diagram representation of a thermal model used, in effect, by the controller to predict future temperatures of the interior of the house in response to different energy inputs to the boiler, the model including the thermal property data to be obtained by the method in accordance with the invention.

FIG. 2 is a simple physics model, with three blocks that can hold heat and transfer heat between each other. These are
(a) the heating system 26 (radiators, underfloor, etc.)—which is directly heated by the heat plant;
(b) the room 28—which is heated by the heating system, and loses heat to the outside world; and
(c) the remaining "disconnected" thermal mass 30 of the house—which can exchange heat with the room (only).

Each of these has a heat capacity C (i.e. quantity of thermal material, taking a certain amount of energy to raise its temperature T), and each link has a thermal conductance k.

The energy flow between the blocks is represented by arrows.

The physics can be written as three coupled linear differential equations for the conduction of heat between each block and the resulting change in temperature:

$$C_R \frac{dT_R}{dt} = k_H(T_H - T_R) - k_W(T_R - T_E) + k_M(T_M - T_R)$$

$$C_H \frac{dT_H}{dt} = E - k_H(T_H - T_R)$$

$$C_M \frac{dT_M}{dt} = -k_M(T_M - T_R)$$

There is an approximation here. Radiators (and also underfloor heating) transfer heat to the room by convection and radiation as well as conduction, which means there is a non-linear relationship between temperature difference and heat transfer. Nevertheless, we can regard the above equations as a linearised approximation around a "baseline" temperature difference, and iterative corrections can if necessary be made for the non-linearity.

A matrix formulation means that the above equations can be more simply represented, and also provides an elegant framework for manipulating sets of temperatures—particularly when we need to manipulate time series of sets of temperatures. This approach is known as a "state space" formulation and is a more modern replacement for the more traditional "transfer function" approach to control theory.

The differential equations above can be rewritten in matrix form as:

$$\frac{dx(t)}{dt} = A_d(t) \times (t) + B_d(t)E(t) + F_d(t)T_E(t) \quad (1)$$

where T is a vector of temperatures $$T = \begin{pmatrix} T_R \\ T_H \\ T_M \end{pmatrix}$$

and the other symbols are matrices or vectors of the thermal parameters of the house {C, T, k}. The suffix d indicates that these matrices and vectors are differential.

$$\underline{A}_d = \begin{pmatrix} \frac{-k_H - k_W - k_M}{C_R} & \frac{k_H}{C_R} & \frac{k_M}{C_R} \\ \frac{k_H}{C_H} & \frac{-k_H}{C_H} & 0 \\ \frac{k_M}{C_M} & 0 & \frac{-k_M}{C_M} \end{pmatrix}; \underline{B}_d = \begin{pmatrix} 0 \\ \frac{1}{C_H} \\ 0 \end{pmatrix} \frac{1}{E_{max}};$$

$$F_d = \begin{pmatrix} \frac{k_W}{C_R} \\ 0 \\ 0 \end{pmatrix}$$

The zeros arise from the assumption that there is no direct heat transfer between the heating system and the thermal mass of the house. In this case there are 6 independent parameters that describe our house model (whether or not the true boiler power is known).

The dynamics of the house are modelled by the evolution matrix $A_d$, and E(t) is a vector of energy inputs to the house (such as the power output from a boiler, usually scaled to ensure 0<E<1 always—see further discussion in "Energy inference" below), whose effect on the house is represented by the matrix $B_d$, and $T_E$ is a vector of external influences to the house (such as the external temperature), whose effect on the house is represented by the matrix $F_d$.

Our thermal parameter learning process will in effect infer values for the matrices $A_d$, $B_d$ and $F_d$.

In the example model, the state of the house is represented by three temperatures (the room temperature, the temperature of the water in the heating system, and the temperature of the internal thermal mass of the house, respectively), where there is a single energy input to the house, and where there is a single external influence (the outside temperature. In this case the model matrices can be expressed as $$A_d = \begin{pmatrix} -r_1-r_2-r_3 & r_1 & r_3 \\ r_4 & -r_4 & 0 \\ r_5 & 0 & -r_5 \end{pmatrix}; B_d = \begin{pmatrix} 0 \\ r_6 \\ 0 \end{pmatrix} \frac{1}{E_{max}}; F_d = \begin{pmatrix} r_2 \\ 0 \\ 0 \end{pmatrix} \quad (2)$$

and they have no time-dependence. x(t) is a three-dimensional vector and E(t) and $T_E$(t) are scalar quantities. In this case, the vector $r=(r_1 r_2 r_3 r_4 r_5 r_6)$ is the set of thermal parameters that we are trying to learn—six numbers that characterise the thermal dynamics of the house. In general, the constitution and size of all of the matrices may be different.

The output of our thermal parameter learning process will be the vector r (from which the matrices $A_d$, $B_d$ and $F_d$ can be reconstructed).

The vector r consists of (inverse) time-scales for the house and heating system, with the units of each element thus being 1/time. The r-parameter for energy input $r_6$ will be different from this—it is often a temperature gradient rather than an inverse time-scale (see discussion below on Energy Inference). $E_{max}$ is the maximum heat energy that can be output by the boiler. In this case the boiler burner is not modulated, so the boiler is either fully on or off.

Hidden Markov Terminology

We will also use a simplified formulation of the house model within this disclosure, equivalent to a standard hidden Markov model:

$$x_k = A_k x_{k-1} + B_k + n_x,$$

This is simply a linearised version of Eqn (1) with a discrete timestep $\Delta t$, at the discrete time index k. With a straightforward linear approximation as long as $\Delta t$ is small:

$$A_k = I + \Delta t A_d, \; B_k = \Delta t B_d E_k + \Delta t F_d T_{E,k}$$

where I is the identity matrix. The matrix $A_k$ describes the thermal model of the house, and will usually not be time varying; the vector $B_k$ contains external influences on the hidden state. The vector $E_K$ describes one or more of the energy outputs from the heating system.

Note that since the overall aim is to infer the vectors of parameters r underlying the thermal model of the house, it would be clearer to write Eqn 3 with the r-dependence made explicit:

$$x_k = A_k(r) x_{k-1} + B_k(r) + n_x$$

It should be borne in mind in all future equations that $A_k$ and $B_k$ are functions of r, and that $B_k$ is also a function of energy input $E_K$ which is in general unknown and must be inferred in order to calculate $B_k$.

Any inference methodology must allow for the uncertainty caused by unknown influences on the system, so we have also extended our model to include "process noise" via the vector $n_x$, which is normally distributed with mean zero and scale matrix Q. This formulation follows standard lines, such as that used for the Kalman Filter. Typically, Q is diagonal with entries chosen by estimating the likely random variation in the corresponding hidden temperature states. A value of Q that works well is discovered by tuning the Kalman Filter in conventional ways. An example is given in the worked example below.

The hidden state is $x_k$—named as such because it can never be directly measured—we only know about it via a measurement $y_k = H x_k + n_y$. The matrix H characterises the relationship between our measurement and the hidden state, and is dependent on the measurements we actually have from our system. For the example above, H could be the vector [1 0 0] indicating that we are just measuring room temperature. In the formulation below, we assume that H is known (although the process could be easily extended to infer H as well, if for example we think our temperature measurement is influenced by the temperature of a wall as well as the air temperature). We also allow for the measurement being subject to a noise $n_y$ which is normally distributed with mean zero and scale matrix R. Typically, R is diagonal with entries reflecting the accuracies of the sensors used to measure temperatures, for example 0.1 C accuracy for a room temperature sensor, means R=100 (=1/sigma^2).

Data Buffering and Selection

Before we describe in detail our method for inferring r, we first explain how a block of measurement data is selected as an input to this process—our method works block-wise on an input buffer of time-series data (and produces an updated value of the vector r as a result of processing this buffer).

The measurement data can come from a variety of possible sources (see example scenarios above and applications below). Most important is the set of measured temperatures from the inside of the house, but generally we will also include what we know about external conditions and the energy input to the house—for example, external conditions and whether heat was requested from a boiler.

Rolling Buffer.

To produce the input buffer, we must maintain a rolling buffer of temperature measurements $y_k$, where data older than the duration of the buffer (for example, a week) is discarded. The rolling buffer is kept updated at a fixed time interval (for example, every 5 minutes) as the measurements arrive, and then at a much longer time interval (for example, every night) the thermal parameter learning process is executed using the contents of the buffer. The time period to which the data in the buffer corresponds (i.e. the period over which the stored temperature data was obtained) is the data acquisition period.

The thermal parameter learning process takes quite a lot of computational time, and must always take place on the buffer as a whole, which is why it is convenient only to execute it every night.

When the system is first started, the input buffer may only be a day long (for example), and then gradually extend in length as data becomes available, until it reaches the maximum length of the rolling buffer (a week for example).

After the first few days, the learning process may be executed less frequently than at first (e.g. every few nights), to reduce usage of computational time.

In effect, we always update our estimates of the thermal parameters using the last week's data, which enables changes to the building or its environment to influence the model in a timely fashion.

We can choose not to carry out a learning process under certain conditions (too warm outside, missing data).

We can choose to mark parts of the input buffer as "invalid," for example when measurements have not been received or are known to be false (e.g. pipe temperatures when there is no water flow).

When we have identified a set of data from the rolling buffer to form our input buffer, we follow the procedure in the next section to update our thermal parameters using it.

Bayesian Inference Approach

This is used to infer a value of the thermal parameter vector r using the data from the input buffer. The process for doing this is outlined in FIG. 3 and qualitatively follows the steps below (in relation to symbols introduced above):

1. Start with a first guess for a sensible value of r (or using the value of r calculated from a previous thermal parameter learning calculation). The first guess of r may come from a fixed set of values that we know is typical of the type of heating system under consideration (e.g. conventional fossil-fuel boiler), or by guessing using physical intuition the likely time constants (e.g. several hours to heat up a wall) or by the method described in PCT Patent Application No. PCT/GB2013/050376 from measured data. The value only needs to be approximately right (order of magnitude).
2. Infer hidden state $\{x_k\}$ from the measurements $\{y_k\}$ over the time period.
3. Infer $\{A_k\}$ and $\{B_k\}$ and the set of hidden states $\{x_k\}$.
4. Deduce $A_d$ from $\{A_k\}$, and separate $\{B_k\}$ into $B_d$ and $F_d$, given knowledge of E and $T_E$.
5. Deduce new value of r from $A_d$, $B_d$, and $F_d$ as their relationship is defined by the house model.

This is the essence of the process conceptually, but in practice we actually need to go directly from x to r.

We now describe more explicitly the information that we require and what the exact steps are to calculate or update r.

The input buffer consists of the following sets of vectors (see also FIG. 3 again), where n is the length of the buffer in time steps:

$\{y_k\}$ for k=1:n, the temperature measurement vector at each time step $\{T_{E,k}\}$ for k=1:n, the measured external conditions $\{P_k\}$ for k=1:n, the information we know about control signals given to the heating system.

We use a forward-filter-backward-sampling (FFBS) method to do this stage of the inference. A standard Kalman filter gives an estimate of the hidden state, but it is biased towards preceding measurements; when we have the whole of a time period logged, measurements that come after a particular time are also useful in telling us something about the hidden state at that time. The FFBS method involves running a Kalman filter forward in time (forward filtering), recording the mean and covariance at each time step, and then sampling backwards in time using these statistics. (see also FIG. 3). The paper "A Tutorial on Particle Filtering and Smoothing" by Doucet & Johansen provides a description of this type of procedure.

Forward Filtering

The first step is to use a forward-filtering approach to infer a number of intermediate quantities: The mathematics centres around the formula $$P(x_k|y_{1:k}) \propto \int dx_{k-1} P(y_k|x_k) P(x_k|x_{k-1}) P(x_{k-1}|y_{1:k-1})$$

and for our model we have:

$$P(y_k|x_k) \sim \exp -\tfrac{1}{2}\{(y_k - Hx_k)^T R(y_k - Hx_k)\}$$

$$P(x_k|x_{k-1}) \sim \exp -\tfrac{1}{2}\{(x_k - A_k x_{k-1} - B_k)^T Q(x_k - A_k x_{k-1} - B_k)\}$$

For forward filtering, we wish to express our understanding of the hidden state as a Gaussian probability distribution:

$$P(x_k|y_{1:k}) \sim \exp -\tfrac{1}{2}\{(x_k - \mu_k)^T S_k (x_k - \mu_k)\}$$

where the matrices $\{S\}$ and the vectors $\{\mu\}$ are yielded by (i.e. one of the outputs of) the forward filtering process.

$\{\mu_k\}$ for k=1:n, where $\mu_k$ is the mean of the inferred Gaussian probability distribution for the hidden state $x_k$ $\{S_k\}$ for k=1:n where $S_k$ is the scale matrix of the Gaussian inferred probability distribution for the hidden state $x_k$ $\{E_k\}$ for k=1:n where $E_k$ is estimated actual energy input to the house model at time k, is derived from $\{P_k\}$ and deductions about evolved temperatures. The way in which this is done (alongside the forward filetering) is described in the section 'Energy Inference' below.

The standard Kalman filter equations provide a method of calculating $\{S_{k-1}, \mu_{k-1}\} \rightarrow \{S_k, \mu_k\}$ using the measurement values, and so we can apply these iteratively starting with a sensible guess for the initial hidden state $\mu_1$ (e.g. wall and pipes are the same temperature as the room) and $S_1$ (e.g. $S^1=Q$). For data marked as "invalid" we use only the prediction step of the Kalman filter.

Energy Inference

The above processes are derived from the standard literature on FFBS. However the vector $B_k$ is dependent on the energy input to the house $E_k$ which is in general unknown, and may not have a linear relationship to other parameters so cannot be included straightforwardly as an additional hidden variable in the inference. The approach used in this method is to infer $E_k$ qualitatively from the current state x as part of the Kalman (forward) filtering, taking into account the control signals that are one of the recorded inputs, and the current estimate of the hidden state.

The value of E (for this timestep k) determined by the forward filtering is then used in the backward sampling as well, although this could be further extended to a probabilistic model for E according to the previous and next states.

In most scenarios the energy input will be unknown, as it represents the thermal energy delivered by the heating source to the heat delivery system (e.g. from boiler to the water in the radiators)—but we require a value of E in order to use our house thermal model. Our approach is to use the value of the hidden state during the forward-filtering, together with what we know about control signals P, to estimate a value for E. For example, for a conventional boiler, if the "hidden" water temperature is too high (e.g. >70 C), we can infer that the boiler will no longer be firing.

A related complication is that the unit E is measured in will vary from scenario to scenario, as often we will only have a relative measurement (such as the fraction of full power the heating system is running at).

To clarify, we provide two example scenarios to illustrate our approach to energy inference.

Conventional Boiler Example.

For a conventional boiler, E is a dimensionless quantity giving the fraction of its maximum output power the boiler is operating at (as a single scalar value). For a non-modulating gas boiler, this will be 1 when the gas flame is on and 0 when the gas flame is off. When E enters our house model equations, it will always be multiplied by an r parameter ($r_6$ in Eqn 2), which characterises the effect the boiler at full power has on the heating system. This r parameter will be learned and will determine the temperature gradient of the water temperature (in isolation) when the energy source is at full power (e.g. $r_6$=180° C./hr).

However, we cannot in general directly measure the state of the gas flame or E—all that is known is the "heat request" control signal to the boiler, which constitutes our P measurement in the buffers above. The boiler will turn off (or modulate) the gas flame to ensure a maximum water temperature is not exceeded, so we use the following logic to infer E from P:

If control signal P=0, we know E=0.
If the control signal P=1, we use the water temperature component of the hidden state, as filtered at the current time in the forward filtering process. We infer that E=1 if the water temperature in the boiler is below an assumed threshold (say 70 C), otherwise E=0.

We have no need to know true powers (e.g. in kilowatts) as all we need to know is how to relate boiler heat requests with their effect on the heating system (as best as we can infer).

Heat Pump Example.

A heat pump is a rather different scenario, as we are likely to be able to measure the input electrical power to the heat pump (via an electricity meter). However, we still cannot determine E immediately, since E is the output thermal power from the heat pump to the heat delivery system. For a heat pump we can use a model for its "coefficient of performance" (COP), the ratio of the output power to the input power, to estimate E from the input power. The COP varies depending on the water temperature, so like the boiler we used the water temperature component of the inferred hidden state to deduce the COP and thus E.

E will be a value in kilowatts, which means that the corresponding component of r will have units of degrees per unit time per kilowatt. This means that we will be able to use r as before to infer as best as we can the thermal effect on the house of a kilowatt of electricity into the heat pump.

Our method would also be applicable if there was no electricity meter installed to measure the input power. In this case, we would return to the dimensionless E, and infer its value similarly to a boiler using the control signal and a few assumptions about the operation of the heat pump at different water temperatures. For the case of a heat pump controlled by specifying target water temperature, we might not need to include E in the inference at all (and just learn about the relationship between the water temperature and other temperatures in the house).

Backwards Sampling

The next step after forward filtering is to use a backward-sampling approach to sample values of the hidden state $x_k$ from the above forward-filtered quantities:

We wish to backwards sample using $\{S\}$ and $\{\mu\}$. We denote X as the sampled value and x as the parameter in a probability distribution. From the above equations we find:

$$X_{k-1} \sim \exp{-\tfrac{1}{2}\{(X_k - A_k x_{k-1} - B_k)^T Q (X_k A_k x_{k-1} - B_k) + (x_{k-1} - \mu_{k-1}) S_{k-1}(x_{k-1} - \mu_{k-1})\}}$$

which can be written as $$X_{k-1} \sim \exp - \tfrac{1}{2}\left\{\left(x_{k-1} - (S_{k-1} + A_k^T Q A_k)^{-1}(S_{k-1}\mu_{k-1} + A_k^T Q(X_k - B_k))\right)^T (S_{k-1} + A_k^T Q A_k)\left(x_{k-1} - (S_{k-1} + A_k^T Q A_k)^{-1}(S_{k-1}\mu_{k-1} + A_k^T Q(X_k - B_k))\right)\right\}$$

where the mean and the scale matrix are for sampling the multi-dimensional Gaussian are made explicit. We can apply standard methods to take a multivariate Gaussian sample from this distribution.

$\{X_k\}$ for k=1:n, where $X_k$ is a particular, randomly-sampled value of the hidden state random variable $x_k$.

Thus we now have the output $X_k$ from the forward-filtering-backwards sampling steps.

The next step is to sample a new thermal parameter vector r using this sampled set $\{X_k\}$ At this point we have a sampled hidden state X at every point in time in our buffer, and wish to use this state to sample the thermal parameters of the house r. We wish to determine the form of $P(r|X_{1:k})$ Using Bayes' theorem and introducing a prior for r:

$$P(r|X_{1:k}) \propto P(X_{1:k}|r)P(r) = P(X_1)P(r)\Pi_k P(X_k|X_{k-1}, r)$$

We ignore $P(x_1)$ because it has no real r dependence, and the likelihood term can be written:

$$P(X_{1:k}|r) \sim \exp{-\tfrac{1}{2}\{\Sigma_k(X_k - A_k(r)X_{k-1} - B_k(r))^T Q(X_k - A_k(r)X_{k-1} - B_k(r))\}}$$

We now have to make the r-dependence of A and B explicit. First, we separate them back into the differential forms above:

$$X_k = A_k X_{k-1} + B_k = (I + \Delta t A_d)X_{k-1} + \Delta t B_d E_k + \Delta t F_d T_{E,k} \text{ so}$$

$$X_k - A_k X_{k-1} - B_k = \Delta t\left(\frac{X_k - X_{k-1}}{\Delta t} - (A_d X_{k-1} + B_d E_k + F_d T_{E,k})\right)$$

and thus $$X_k - A_k X_{k-1} - B_k = \Delta t\left(\frac{X_k - X_{k-1}}{\Delta t} - D_k r\right)$$

defining the matrix D. For the specific example we considered above in Eqn 2, $$D_k = \begin{pmatrix} X_{k,2} - X_{k,1} & T_{k,E} - X_{k,1} & X_{k,3} - X_{k,1} & 0 & 0 & 0 \\ 0 & 0 & 0 & X_{k,1} - X_{k,2} & 0 & E_k \\ 0 & 0 & 0 & 0 & X_{k,1} - X_{k,3} & 0 \end{pmatrix}$$

where the addition numeric suffix on X indexes the vector components. D thus intuitively give the differences in temperature between different model states that affect other model states when multiplied by each element of r, thus separating the effects of the different components of r, and representing them in s a linear matrix form. Note the matrix multiplication in the term D r.

Now we have a multivariate Gaussian likelihood function for r:

$$P(X_{1:k}|r) \sim \exp{-\tfrac{1}{2}\left\{\Sigma_k\left(\frac{X_k - X_{k-1}}{\Delta t} - D_k r\right)^T \Delta t^2 Q\left(\frac{x_k - x_{k-1}}{\Delta t} - D_k r\right)\right\}}$$

The intuition here is that we should favour values of r that mean that the temperature gradient ($\Delta X/\Delta t$) match what the model predicts (D r). We need to now apply the sum over k to get a multivariate likelihood distribution for r:

$$P(X_{1:k}|r) \sim \exp -$$

$$\frac{1}{2}\left\{r^T(\Delta t^2 \Sigma_k D_k^T Q D_k) r - \left(\Delta t^2 \Sigma_k \left(\frac{X_k - X_{k-1}}{\Delta t}\right)\right)^T Q D_k\right\} r - r^T(\ldots)^T\right\} \sim \exp -$$

$$\frac{1}{2}\{(r-\rho)^T U(r-\rho)\}$$

defining scale matrix U and mean vector P. The scale matrix U includes correlations between different r parameters, which would be very hard to represent using less complex mathematics.

At this point, we have a mathematical equation for the (likelihood) probability distribution of the thermal parameter vector r (given the input data buffer). The final step of the process is to take a sample from this distribution to use as the output of the process.

In order to sample r, we need to include its prior for a Bayesian treatment (the formula above is the likelihood). All components of r are positive (by the laws of physics)—for example, the hidden wall temperatures have slow time constants and low r values and are thus driven towards zero, and prior "pressure" is needed to keep them physical and stop instability. We choose independent gamma priors for r:

$$P(r|\{m_j, \theta_j\}) \sim \Pi_j r_j^{m_j - 1} e^{-r_j/\theta_j}$$

and thus the final posterior distribution for r that we need to sample from is the following function:

$$P(r|x_{1:k}, \{m_j, \theta_j\}) \sim \exp \quad (11)$$

$$\left\{-\frac{1}{2}\Sigma_{ij} r_i U_{ij} r_j + \Sigma_{ij} \rho_i U_{ij} r_j - \Sigma_i r_i/\theta_i + \Sigma_i (m_i - 1)\log r_i\right\}$$

Our method for sampling this function is to expand the log term around the mode of the distribution, and then use rejection sampling on the resulting multivariate Gaussian. The output of this mathematical process is a single vector value for the new sampled r.

When sampling from the resulting posterior the approach adopted in this method is to (a) calculate the mode of the distribution and (b) "rejection sample" from a multivariate Gaussian centred at the mode. The methodology that provides a sample from the posterior probability distribution in Eqn (11).

Rejection sampling is a standard technique in the literature, which enables samples to be drawn from a distribution that cannot be analytically sampled from, by sampling from a similar proposal distribution (that can be analytically sampled from) and rejecting samples if the desired distribution has lower probability than the proposal distribution. This is done in a way that can guarantee mathematically that samples are representative of the desired distribution. The only downside is that a vast number of samples might need to be rejected, but this can be avoided with careful choice of proposal distribution, which is what we describe here.

Rejection Sampling

We wish to sample r from the following probability distribution (duplicate of Eqn 11), where U, $\rho$, $\theta$ and m are known (from the previous calculations in Appendix B).

$$P(r|x_{1:k}, \{m_j, \theta_j\}) \sim \exp$$

$$\left\{-\frac{1}{2}\Sigma_{ij} r_i U_{ij} r_j + \Sigma_{ij} \rho_i U_{ij} r_j - \Sigma_i r_i/\theta_i + \Sigma_i (m_i - 1)\log r_i\right\}$$

We use a Newton-Raphson method to solve for the mode (maximising the exponent).

$$0 = -\frac{\partial P}{\partial r_l} \sim \Sigma_i U_{il}(r_i - \rho_i) + 1/\theta_l - (m_l - 1)/r_l$$

with Hessian matrix $H = U + I \cdot (m_j - 1)/r_j^2$ where j indexes the diagonal in the second term. The step $\delta_r$ satisfies $H\delta r = -$[Eqn 12] above, and this is solved straightforwardly by linear elimination. The starting point for the Newton-Raphson iterations is the current r used in the first FFBS stage.

Suppose that the mode we have found is at r=v. We now expand the log term around this point:

$$\log r_i \approx \log v_i + (r_i - v_i)/v_i - (r_i - v_i)^2/v_i^2$$

We now deliberately ignore the quadratic term, as it will ensure that our proposal density is greater than the true density at all points, and so the log term adds an additional term $(m_i - 1)r_i/v_i$ to the exponent. Our proposal density becomes:

$$P(r|x_{1:k}, \{m_j, \theta_j\}) \sim \exp -\frac{1}{2}\{(\ldots)^T U(r - \rho - U^{-1}((m_j - 1) r_j/v_j - 1/\theta_j))\}.$$

So for our rejection sampling, we first sample r from the above Gaussian distribution, and the rejection criterion is simply the ratio of the true log to the approximated log (with an implicit multiplier such that the probability densities are equal at the mode):

$$a = \exp \Sigma_j (m_j - 1)[\log r_j - (\log v_j + (r_j - v_j)/v_j)]$$

Hence we sample a uniform random number $0 \le u < 1$ and if $u < a$ we accept the sample, otherwise we re-sample from the Gaussian above. The Gaussian can inevitably produce negative samples; these are rejected straight away before calculating a.

Additional steps are required if the matrix U is not of full rank (this occurs for example if there is never any heat input to the system): the process is to eliminate dimensions until U is of full rank, and leave these components of r unchanged in that learning cycle.

Figure 3:
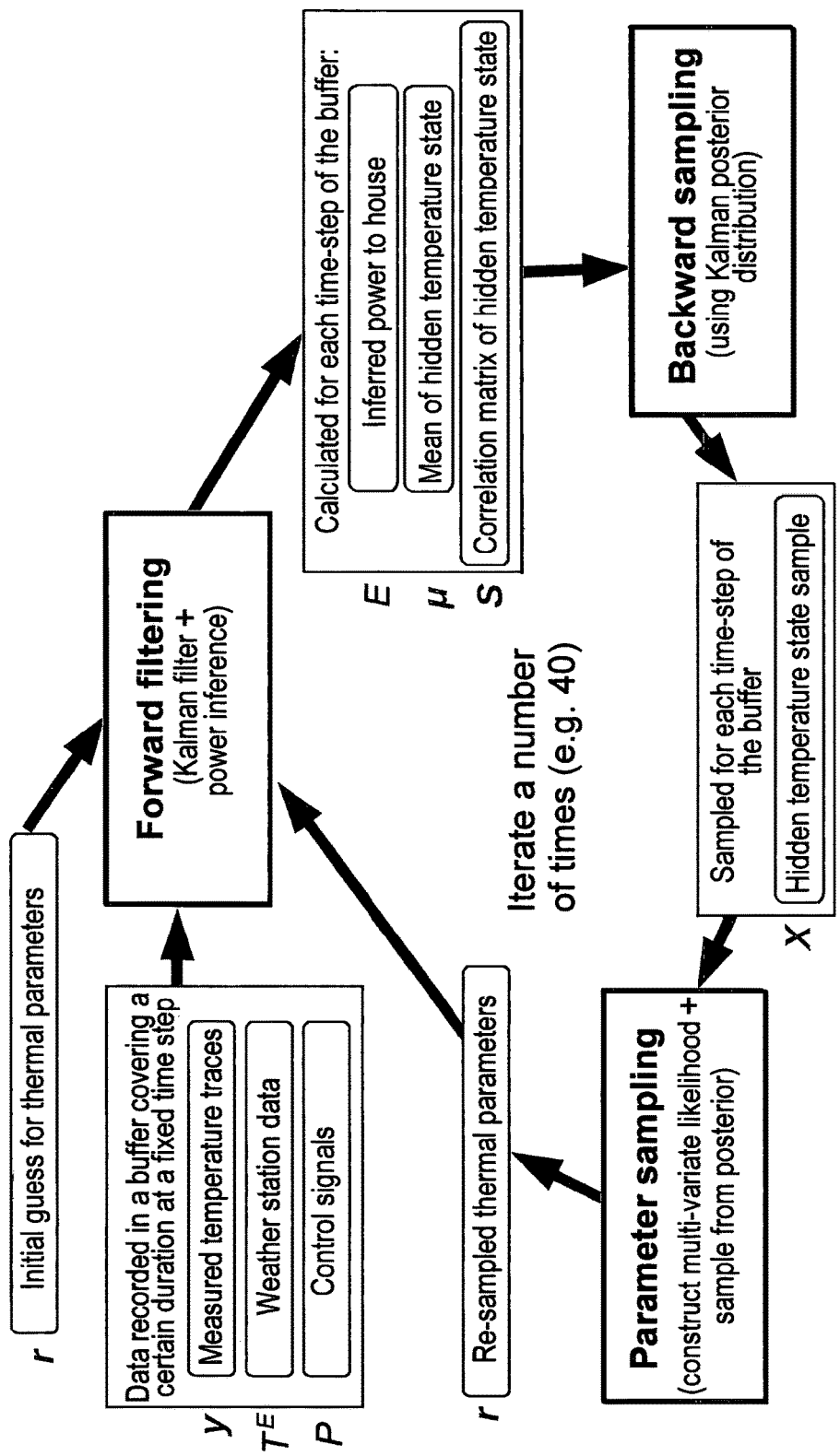
FIG. 3 is a block diagram illustrating an iterative process for determining the thermal property data (represented as the vector r)

It will be appreciated that the above process for sample r by rejection sampling is within the parameter sampling block of FIG. 3, while the iteration of r as a whole is represented by the cycle/loop illustrated in FIG. 3.

Overall Iterations

After r has been sampled, we then iterate by starting again at the first step (forward-filtering) with the new value of r, and repeat the whole process a number of times (e.g. 30).

Optionally, we can start the iterations off with an assumption that the process noise is large, and gradually decrease it as a type of simulated annealing, in order to ensure the process is not trapped near the initial values.

Optionally, we can make a decision at this point as to whether the new value of r is sensible. For example, we could put bounds on values of r from physical knowledge of the house, or we could analyse for periods of unexpected heat (e.g. from an open fire or log burner) that would distort the results. This decision is completely separate from the acceptance criterion used in the rejection sampling (the latter is a completely mathematical construction).

The procedure described above constitutes a Bayesian "Gibbs sampling" process for inferring $\{X_k\}$ and r. The Bayesian formulation of the original problem is the probability distribution $P(x_{1:n}, r|y_{1:n})$, and we sample $\{X_k\}$ and r from it. The Gibbs sampling process is to start with an initial guess for r, and then use this to sample from $P(x_{1:n}|y_{1:n}, r)$, which is in fact a standard task known as "smoothing" and the method we chose is "forward-filtering-backward-sampling" (FFBS). The second Gibbs step is to sample r in turn given the sample $\{X_k\}$, from $P(r|x_{1:k})$, y is no longer required as it has no more information now we have an (assumed) value of x.

Use of Results

FIG. 4 helps to illustrate possible use of the thermal property data obtained by the method according to the invention. This information can be used to improve temperature control or provide useful feedback to the householder about the management of their house's heating system. The overall concept is a feedback loop of measuring temperatures, analysing them, and changing the way heating is managed as a result.

The outputs of the "thermal parameter learning" block are used to provide useful insight to a consumer, as well as automatically as part of a heating control system. The thermal parameter learning block resides on a "home energy management system" consisting of a computer with an ability to store and process data, and optionally interact with a user via a display and input ability (e.g. touchscreen).

EXAMPLE SCENARIOS

Possible Inputs:
Temperature measurements: from a room air sensor, from an external sensor, from pipe sensors (e.g. measuring the temperature of water in the heating system), or other sensors (e.g. reflecting the temperature of bricks in a storage heater).
External weather data provided from a weather station (either locally or via an internet feed): temperature, solar irradiation, or any other value that can provide a thermal influence on the house.
Control signals from the heating control system, such as heat requests to the boiler, or power consumption of the heating system, etc. Ideally, both input and output energy of the heating system is measured, but often only control signals are available, and sometimes nothing is available (e.g. if a monitoring system is being used that is separate to an existing heating controls system).

Not all of these inputs are required for the invention to work; we describe below a number of different scenarios for its deployment.

Example: gas boiler, we measure room temperature and external temperature (possibly via internet weather station), and record the control signals (on/off) given to the boiler.

Example: gas boiler, we measure room temperature and external temperature (possibly via internet weather station), but have no access to control signals as we're in a monitoring only scenario.

Example: heat pump, we measure room temperature and external temperature as for the boiler, and also measure flow & return pipe temperatures and the power consumption of the heat pump.

Example: storage heater, we measure room temperature and external temperature again, the power consumption used to charge the storage heater, and also the control signal given to the discharge vent (requires storage heater extension in Appendix D)

More accurate inference is possible with the addition of information about the temperature of the bricks inside the storage heater. For example, we could use a sensor attached to the outside of the storage heater, which measures a temperature that is influenced by the warmth of bricks inside. An advantage of our methodology is that it allows this indirect "influence" to be utilised.

If control signals are unknown (i.e. no information on charge or discharge from the storage heater), our methodology can still be used (this would require something similar to the particle-filtering extension).

Example: any of the above scenarios could be easily extended to allow for solar irradiation (as measured by an internet weather station) by including an additional external influence term in the house model and learning the extent to which the room temperature is warmed by natural sunlight. The influence of other weather data could be included equivalently.

Example: any of the above scenarios could be easily extended to a multiple room configuration, whereby room temperature sensors are placed in each room and the house model is expanded to include states for each room and the connections between them. Our invention would then enable us to learn how much the thermal response of different rooms are correlated and which rooms are losing the most heat to outside.

Our thermal learning method provides a way in which a block of data from a house can be processed in order to produce a matched model of the thermal response of the house. This model can then be used to make predictive deductions about the house, for example how temperatures will change in response to particular control signals or energy inputs, and we give some example applications in later sections.

As described above, the method can be applied to any situation where there is a linear house model and a means of inferring the thermal input provided by the heating system, given the history of control signals.

There are four areas where we have extended the invention to cover further applications:

(1) Storage heaters. Storage heaters use a bank of bricks to store heat from cheap overnight electricity and release it when required. They are controlled by two signals: one to charge the bricks, and one to adjust the position of the discharge vent. We model the storage heater as a radiator with a varying thermal conductance to the room (i.e. $r_1$ and $r_4$ in our example above), from a minimum value (representing how much heat the bricks lose when the vent is shut) to a maximum value (representing the most heat it can deliver when the vent is fully open).

When the discharge vent of a storage heater is moved by a control algorithm, the thermal model of the house is changed, so special treatment is required: (a) we need to adapt the model according to this control signal as part of the "smoothing" process when sampling X (adapting the forward filtering backwards sampling procedure), and (b) we need to learn the ratio between the heat transfer coefficient when the vent is fully open and when the vent is fully closed. The control parameter directly affects the evolution matrix A, and there are two different thermal characteristics to learn: the thermal conductivities at minimum and maximum vent positions.

A storage heater with a variable vent position v can be modelled by the slightly adapted propagation matrix:

$$A_d = \begin{pmatrix} -vr_1 - r_2 - r_3 & vr_1 & r_3 \\ vr_4 & -vr_4 & 0 \\ r_5 & 0 & -r_5 \end{pmatrix}$$

The vent multiplier v satisfies $u_{min} < u < 1$ (without loss of generality, as the unaltered r parameter represents the maximum vent position). This is related to the vent control signal $u_c$ (which satisfies $0 \leq u_c \leq 1$) by $u = u_{min}(1 - u_c)$. We can see that A (and thus D also) is now non-linear in the effective parameter vector $[r; v_{min}]$ and so our formalism cannot readily be extended to the storage heater scenario.

Our approach is to include an additional Gibbs sampling step for $v_{min}$:

Firstly, assume a value for $v_{min}$ or use the previously learned value, and sample X assuming this value (calculating changes in A along the way using the known control signal $v_c$ and the assumed $v_{min}$ to calculate v) using the same method as Appendix A.

Secondly, sample r as previously, again using the same method as previously (Appendix B), calculating D as follows since v is assumed known.

$$D = \begin{pmatrix} v(T_2 - T_1) & T_E - T_1 & T_3 - T_1 & 0 & 0 & 0 \\ 0 & 0 & 0 & v(T_1 - T_2) & 0 & E \\ 0 & 0 & 0 & 0 & T_1 - T_3 & 0 \end{pmatrix}$$

Thirdly, we sample $v_{min}$ given the previously sampled X and r values. This requires new mathematics where we factorise D into two matrices such that $D = D + v_{min} + D^-$. These matrices are:

$$D^+ = \begin{pmatrix} T_2 - T_1 & T_E - T_1 & T_3 - T_1 & 0 & 0 & 0 \\ 0 & 0 & 0 & T_1 - T_2 & 0 & E \\ 0 & 0 & 0 & 0 & T_1 - T_3 & 0 \end{pmatrix} v_c$$

and $$D^- = \begin{pmatrix} T_2 - T_1 & T_E - T_1 & T_3 - T_1 & 0 & 0 & 0 \\ 0 & 0 & 0 & T_1 - T_2 & 0 & E \\ 0 & 0 & 0 & 0 & T_1 - T_3 & 0 \end{pmatrix} (1 - v_c)$$

and known at each timestep (given the temperature state sample and the control signals).

Recall the likelihood function used previously:

$$P(X_{1:k} \mid r) \sim \exp - \frac{1}{2} \left\{ \Sigma_k \left( \frac{X_k - X_{k-1}}{\Delta t} - D_k r \right)^T \Delta t^2 Q \left( \frac{X_k - X_{k-1}}{\Delta t} - D_k r \right) \right\}$$

Rewriting to look at $v_{min}$ influence:

$$\frac{X_k - X_{k-1}}{\Delta t} - D_k r = \left( \frac{X_k - X_{k-1}}{\Delta t} - D_k^+ r \right) - v_{min}(D_k^+ r)$$

we get $$P(X_{1:k} \mid r, v_{min}) \sim \exp \left\{ -\frac{1}{2} K v_{min}^2 + L v_{min} \right\}$$

where $K = \Sigma_k r^T D_k^{-,T} \Delta t^2 Q D_k^- r$ and $$L = \Sigma_k r^T D_k^{-,T} \Delta t^2 Q \left( \frac{X_k - X_{k-1}}{\Delta t} - D_k^+ r \right)$$

(being careful about factors of 2)

We choose a truncated Gaussian prior for $v_{min}$ $$P(v_{min}) \sim \exp - \frac{(v_{min} - \mu)^2}{2\sigma^2} : 0 < v_{min} \leq 1$$

and thus the posterior $$P(v_{min} \mid X_{1:k}, r) \sim \exp \left\{ -\frac{1}{2} \left( K + \frac{1}{2\sigma^2} \right) v_{min}^2 + \left( L + \frac{\mu}{2\sigma^2} \right) v_{min} \right\} =$$

$$\exp \left\{ -\frac{1}{2} a v_{min}^2 + b v_{min} \right\}$$

defining a and b. We are now ready to actually sample $v_{min}$, which we do by first sampling u as a uniformly distributed random number between 0 and 1, and then calculating $$v_{min} = \frac{b + \sqrt{2a} \, \mathrm{erfinv} \left\{ u \mathrm{erf}\left( \frac{a-b}{\sqrt{2a}} \right) + (1-u) \mathrm{erf}\left( \frac{-b}{\sqrt{2a}} \right) \right\}}{a}$$

where "erf" is the standard error function and "erfinv" is the inverse of the standard error function.

Finally, we finish the symmetrical Gibbs process by resampling r again with the new $v_{min}$ parameter.

At the end of the process we have an updated estimate for the minimum vent position thermal conductivity as a multiplier of the corresponding r parameters (in this case, $r_1$ and $r_4$).

(2) Unknown Control Signals.

It is desirable to learn about the thermal properties of the house in the situation when only able to monitor temperatures independently of the control system—in this case we do not know the control signals given to the heating system, and are thus unable to directly infer the power provided to the house. However, in some circumstances temperature measurements give strong clues as to when the heat input occurs—for example a gas boiler is powerful enough that temperatures rise rapidly. This is a significantly harder inference problem, but can be solved within the framework of this invention. We will refer to a boiler scenario below, but it is more widely applicable as well.

For this inference we need to allow for the boiler firing a while before there is any measurable effect on the room temperature. So as part of the inference process, at each time step we effectively need our simulation to predict the consequences of both the boiler firing and not.

Naively, this leads to an impossibly large tree of possibilities after a short time, but we can make progress using a technique called a particle filter. This works by representing the state with a fixed large number of particles which evolve with time, each has a "weight" which is updated according to how successful the particle is at explaining the data. Every so often, we kill off the unsuccessful particles and "breed" the most successful particles.

We use these particles just to represent the boiler on/off state, and retain the Kalman filter approach for temperatures—each particle has a Kalman filter associated with it, and this bank of Kalman filters interact when the particles are resampled. The model is a "conditionally linear Gaussian model"—the evolution equation switches depending on the boiler firing state. We follow the approach of Douchet & Johansen "Rao-Blackwellised particle filtering".

The sampling of r as described above is unchanged—the particle filter method is used to sample the model state X instead of the FFBS approach.

Each particle evolves independently, and we record at each time step the weight of each particle, its power decision, and its Kalman mean. The covariance is identical across particles (no dependence on B in the maths) so we just need to record this once at each timestep.

Introducing $u_k$ for the boiler firing variable, we wish to sample from:

$$P(x_k, u_k | y_{1:k}) \propto P(x_k | y_{1:k}, u_k) P(u_k | y_{1:k})$$

So our inductive probability is a combination of the Kalman filter in the presence of a known firing (as above) and a probability of firing (second term) represented by the particle distribution.

Our particle update step is:

$$P(u_k | y_{1:k}, u_{1:k-1}) \propto P(y_k | y_{1:k-1}, u_{1:k}) P(u_k | u_{k-1}) \propto \int_{dx_{k-1}} dx_k P(y_k | x_k) P(x_k | x_{k-1}, u_k) P(x_{k-1} | y_{1:k-1}, u_{1:k}) P(u_k | u_{k-1})$$

which is the same as the standard Kalman filter equations with $x_k$ integrated out. This is the key maths: the residual term from the Kalman step is usually left out, but there is still dependence on $B_k$ in this term, which is in turn dependent on u so we need it in this case.

Note the appearance of $P(u_k | u_{k-1})$: this is the prior probability of one boiler state given the previous; this is quite important as it allows us to make it more likely for the boiler to stay in its current state and discourage the algorithm from rapidly cycling the boiler. So for example, $P(0/0) > P(1/0)$, to express the fact that the boiler stays off much more frequently than it get turns on.

Taking care with all the residual terms we can derive the following relationships in a similar fashion to the Kalman Equations $$P(u_k | y_{1:k}, u_{1:k-1}) \propto$$

$$\exp -\frac{1}{2} \{ (y_k - Hx_k^{pred}(u_k))^T W_k (y_k - Hx_k^{pred}(u_k)) \} P(u_k | u_{k-1})$$

where W is the Kalman residual covariance (inverted) and $x_k^{pred}(u_k) = A_k x_{k-1} + B_k(u_k)$ is the predicted state.

This is all we need to implement a particle filter. We weight particles at k−1 according to $\Sigma_{u_k} P(u_k | y_{1:k}, u_{1:k-1})$ (this is in effect one step ahead, taking advantage of the "auxiliary particle filter" concept—this means we can avoid throwing out half our particles each step), and we sample $u_k$ with weights on 0 and 1 according $P(u_k | y_{1:k}, u_{1:k-1})$. After sampling $u_k$ we can Kalman filter each particle as previously, as all $u_{1:k}$ are known for each individual particles.

The output from forward filtering is a power level (0 or 1), weight, and temperature state (mean) for each particle at each moment in time, plus a covariance matrix at each point in time for all particles. The weight reflects the importance of that particle.

Particle Filter Step-by-Step Instructions
(For the specific example of boiler firing)
Forward Filtering
Initial Values:
  $S^1 = Q$ as for the normal case (there is a single value, rather than one for every particle)
  $\mu_{1,p}$ is a sensible guess for the initial hidden state, for each particle $p = 1 \ldots n_p$.
  All particles have equal weight $w_{1,p} = 1/n_p$.
For Each k:
  Calculate updated error scale matrix $S_k$ from $S_{k-1}$ using the normal Kalman filter equations, keeping a note of the residual covariance matrix $w_k^{-1}$ and the Kalman gain matrix $K_k$.
  For each particle p:
    1. Calculate the predicted state both in the presence and absence of boiler firing:

$$\mu_{k,p}^{pred, u=0} = A_k \mu_{k-1,p} + B_k^{(E=0)}$$

$$\mu_{k,p}^{pred, u=1} = A_k \mu_{k-1,p} + B_k^{(E=1)}$$

where we are using as before the functional dependence of B on the energy input E.
    2. Calculate the residual for both cases:

$$z_{k,p}^{u=0} = y_k - H \mu_{k,p}^{pred, u=0}$$

$$z_{k,p}^{u=1} = y_k - H \mu_{k,p}^{pred, u=1}$$

3. Calculate the updated state estimate for both cases:

$$\mu_{k,p}^{new, u=0} = \mu_{k,p}^{pred, u=0} + K_k z_{k,p}^{u=0}$$

$$\mu_{k,p}^{new, u=1} = \mu_{k,p}^{pred, u=1} + K_k z_{k,p}^{u=1}$$

4. Calculate the likelihood weighting for both cases:

$$l_{k,p}^{u=0} = \exp\left( -\frac{1}{2} z_{k,p}^{(u=0),T} W_k z_{k,p}^{u=0} \right)$$

$$l_{k,p}^{u=1} = \exp\left( -\frac{1}{2} z_{k,p}^{(u=1),T} W_k z_{k,p}^{u=1} \right)$$

Note that here it is advantageous to work in logarithms and shift the ratio of these to to avoid the limits of machine precision.
    5. Calculate prior probabilities $P(u_k = 0)$ and $P(u_k = 1)$ for each particle according to previous state $u_{k-1}$, using model $P(u_k | u_{k-1})$, and taking care of model behaviour at maximum water temperature.
    6. Re-weight particles against either outcome:

$$w_{k,p} = w_{k-1,p} * (l_{k,p}^{u=0} P(u_k = 0) + l_{k,p}^{u=1} P(u_k = 1))$$

Renormalise particles so $\Sigma_p w_{k,p} = 1$ and calculate whether $\Sigma_p w_{k,p}^2 > 2/n_p$, and if it is, re-sample particles according to standard particle filter equations: choose $n_p$ random particles with probability proportional to their weight, give these ones equal weight, and discard the rest.
For each particle: Randomly decide whether boiler fires, proportionally to $l_{k,p}^{u=0} P(u_k=0)$ and $l_{k,p}^{u=1} P(u_k=1)$, and taking care of maximum water temperature, and record the choices as $E_{k,p}$, and also record the state $\mu_{k,p}$ according to the firing choice.

Moving Onto Backward Sampling, We Used Previously $$X_{k-1} \sim \exp-\frac{1}{2}\{(\ldots)^T Q(X_k - A_k x_{k-1} - B_k) + (\ldots)^T S_{k-1}(x_{k-1} - \mu_{k-1})\}$$

$$X_{k-1} \sim \exp-\frac{1}{2}\{(\ldots)^T (S_{k-1} + A_k^T Q A_k)$$

$$(x_{k-1} - (S_{k-1} + A_k^T Q A_k)^{-1}(S_{k-1}\mu_{k-1} + A_k^T Q(X_k - B_k)))\}$$

but there are additional terms that don't involve $x_{k-1}$ but do involve $B_k$ which is a function of $u_k$:

$$\exp-\frac{1}{2}\{\mu_{k-1}^T S_{k-1}\mu_{k-1} + (X_k - B_k)^T Q(X_k - B_k) -$$

$$(\ldots)^T (S_{k-1} + A_k^T Q A_k)^{-1}(S_{k-1}\mu_{k-1} + A_k^T Q(X_k - B_k))\}$$

This provides the weighting to sample a particle for the next step backwards ($B_k$ is a function of $u_k$ so we evaluate for both possibilities); this determines the next mean and the previous (in time) power.

We have to be very careful about which index corresponds to which power level and which weight and the order of doing things; the kth weight is for $x_k$ and for the power which transitions between k−1 and k.

We also need to be careful of the difference between request and actual boiler power, because the transition probability only applies to the request—we want to limit cycling for the request but not for actual power. This can be applied with some extra logic in both FF and BS.

Backward Sampling

Initial Values:

Hidden temperature state $X_{n_k}$, sampled from multi-dimensional Gaussian specified by scale matrix $S_{n_k}$ and mean $\mu_{n_k,p}$, where we have chosen p by sampling a particle (taking account of weights at this time-step).

For each k (backwards, starting with $n_{k-1}$):

For each particle p:

1. Calculate $G_{k,p} = S_k \mu_{k,p} + A_{k+1}^T Q(X_{k+1} - B_{k+1,p})$ where $B_{k+1,p}$ is calculated using the previously sampled $E_{k+1,p}$ (in forward filtering).
2. Calculate $$V_{k,p} = \exp-\frac{1}{2}\{\mu_{k,p}^T S_k \mu_{k,p} +$$

$$(X_{k+1} - B_{k+1,p})^T Q(X_{k+1} - B_{k+1,p}) + G_{k,p}^T (S_k + A_{k+1}^T Q A_{k+1})^{-1} G_{k,p}\}$$

3. Calculate posterior weight $h_{k,p} = w_{k,p} V_{k,p} P(E_{k,p}|E_{k+1,p})$ where the last term is dependent on model transition probabilities $\{P(u_k|u_{k-1})\}$ and water temperature state, again using logarithmic scaling on $V_{k,p}$ to take out the normalisation constant (i.e. subtract largest value as logarithm).

Sample a particle from the set with weights proportional to $h_{k,p}$. We then use the Kalman mean $\mu_{k,p}$ and power decision $E_{k,p}$ of this particle p as the basis of the backwards sampling for this step. $X_k$ is sampled as before (i.e. non-particle-filter) using these values.

The output of the backward sampling is a single sample $\{X_k\}$, $\{u_k\}$ (as we have sampled a particular particle at each time step)—and then this can be used exactly as previously for sampling r.

Note that this process is readily extendible to scenarios other than the boiler firing example described here—we just need a modelled probability distribution akin to $P(u_k|u_{k-1})$ which is used to weight and sample particles. A discrete distribution is likely to be sufficient, and makes the latter step easier.

(3) No control signals but measure water temperature. An alternative approach to the scenario where we do not have access to control signals is to monitor the flow/return pipes and learn the thermal response of the house to water temperature as an external influence. This would be a better approach in the case of a heat pump, for example, where these temperature measurements are likely to be available.

(4) Hot water control. A similar approach can be used to characterise the thermal dynamics of a hot water tank, including how quickly it heats up, how heat moves around (e.g. stratification), and how quickly it cools down. This would utilise three tank sensors (as described in our previous patent applications ref 1574 or 1590), and a linear model of heat transfer between different segments of the hot water tank.

Applications

Application: Use as Part of a Control System (Automatic Feedback)

This invention is applicable where the inferred house model is used as part of a predictive control system for managing temperatures in the house. Predictive Temperature Control (as is employed in the methods described in the Huval paper (mentioned above) or PCT Patent Application No. PCT/GB2013/050376) requires a linear model of the form produced by the method described in this document, and uses it to calculate the optimum strategy for heating the system over a future time window. The model to do this can be produced by simpler methods but our approach provides simpler results and greater applicability—for a slow responding heating system with a heat pump or underfloor heating it would be very hard to infer a house model without sophisticated methods such as we have described here.

The method is fully automatic and invisible to any human operator. The control system starts off using a preset house model, which is updated after measurements come in, and constantly updated (e.g. every night) with new information. The updates are not carried out in situations where the information is questionable: e.g. warm periods, missing sensor data.

Example: Heat pumps are very hard to control and usually need an installer to choose a "heat slope" which effectively represents the installers belief about the level of house insulation. Our approach to heat pump control eliminates the need for a heat slope as the control algorithms are automatically aware of the thermal dynamics of the house through the learning process, and we estimate that 10% savings in energy consumption are likely to be possible in practice from this approach.

Example: Weather forecasts. With heat pumps and underfloor systems, houses can respond very slowly to heat input, and so changes in internal temperature or other external conditions such as sunlight can cause significant over or under heating. Learning a model of a house, the house responds to external conditions (see example above re solar irradiation influence) means that it is possible to control its room temperature a lot better, by receiving a weather forecast from an internet feed for example and adjusting controls accordingly.

Example: Multi-zone properties, where heat can be channeled to different sets of rooms independently, can be hard to control as temperatures on one room influence another.

With a learned model of these connections, we can allow for these influences in advance and ensure for example that a bedroom does not overheat as a result of heating another room previously.

Example: Hot water, learning a model of a hot water tank, and measuring hot water demand over the course of a day, means that we can optimise production of hot water, for example to not reheat the tank if there will be sufficient left for the evening taking into account cooling and consumption. It also means we can optimise for secondary heat sources such as solar thermal through the use of a weather forecast and knowledge of the impact of irradiation on hot water production via the panels.

Application: Insight (for Manual or Semi-Automatic Feedback)

The secondary application of this invention is to use the inferred house model to present useful insight to the householder (or other stakeholder such as a landlord). This would mean that they can take actions to improve the physical heating system, the control set-up, or their behaviour in using it. In some cases this feedback is possible semi-automatically, where the system gives the user a suggestion through an interactive interface, to which they have to simply agree to the change rather than go off and implement it independently—this would be possible for example if the control system itself is also doing the learning and communication, and the recommendation is a change in control setting.

In general, the model provides a quantitative picture of how the house responds to heat input and external conditions, how much energy is required to achieve certain temperature patterns, how quickly the house loses heat, how different parts of the house and heating system exchange heat with each other: insight can be provided in all of these areas.

We list some specific examples of applications of insight from the house model (in no particular order).

1. Energy consumption/savings prediction. We can use our model to simulate different control strategies and find out the energy impact of a change in the heating schedule, or an override where the householder turned the heating off for a period. This enables quantitative feedback to the customer on the energy consequences of their actions, which will guide them to behave differently in the future.
2. Dynamic feedback on control settings. Similarly to above, we can use a user interface to display the consequences of user choices such as set point and schedule. This could involve a simple graph of predicted room temperature and predicted boiler firing times (so the user can understand what the system is doing and how early a noisy boiler might kick in), as well as predicted energy consumption over the time period.
3. Temperature anomalies. Since we know how the house normally responds to heat input and external conditions, we can identify with confidence events that are unusual. For example, it would be possible to detect sudden cooling caused by windows/doors being left open, or anomalous heating from an oven or log burner. These could be used to prompt the user that they've left the window open, or provide feedback on how much heating oil they have saved by using the log burner (again, using the house model to predict energy consumption in different situations).
4. House characterisation. It would be a valuable service to provide feedback as to the level of insulation a house had, simply by monitoring temperatures. Temperature gradient during a cooling period can indicate insulation levels, as a greater rate of decline indicates more heat loss, but in practice this does not work well because of the influence of thermal inertia—a poorly insulated house with a large thermal mass could have a stable temperature. Our learned house model enables us to distinguish between these two effects.

In conjunction with a smart gas meter the method could provide quantitative heat loss estimates.

The other hidden states provide insight too: internal thermal mass temperature, external-facing wall temperature, radiator temperature.

1. Fault diagnosis. Similarly to above, we can detect step changes in thermal properties which might indicate a fault with the heating system (such as a seized pump or leaky valve, where boiler firing would not result in as much heat to the rooms as before). Other methods are possible, but the learned house model is superior because we can eliminate the influence of external conditions or brief anomalies.
2. Responsiveness insight. The timescales produced by the house model are interesting in themselves, and would enable presentation to the householder of observations such as how long it takes to heat the house up and whether it's worthwhile turning the heating off when you go out for a short period. This could lead to automatic heating modes such as "keep my house within 20 minutes heating time of 20 C", and also flagging to the user of short scheduled warm periods where it would take a disproportionate amount of energy to reach set point (as the house would have to be warmer for far longer). This is a case where "semi-automatic" changes could be implemented (changes in heating schedule should not be done fully automatically without the say-so of the householder).
3. Heat pump sizing and choice of "heat slope". The quantitative understanding in the house model about the relationship between radiator temperature, internal temperature and external temperature is particularly valuable for heat pumps. A monitoring period (using flow/return pipe sensors) prior to installation could help determine what size of heat pump would be necessary and whether radiators needed to be upgraded. It would also be able to specify the right "heat slope" for the house and heating system.
4. Storage heater settings. Learning the properties of a house with storage heaters could enable dynamic advice on controlling it, which is something many people find difficult and is often inefficient. This would require a level of monitoring of charge power (e.g. through current clamps) and ideally charge level (e.g. temperature sensors placed on the storage heater). The user interface would provide a recommendation (in the light of weather forecast as well as the user's prediction of occupancy and set points for tomorrow) of "We suggest you set your storage heater charge level to 3 and tomorrow morning set the discharge at 2."
5. Multi-zone insight. Along the lines of the automatic example above, we could provide feedback to the user on setting their timers and zone settings, for example "your bedroom receives a lot of heat from downstairs, so we recommend disabling your upstairs zone for morning heating".

Worked Example

With reference to FIGS. 5 to 10 we consider a real example of learning the thermal properties of a house with boiler. We have knowledge of the control signals, so the measurements are the room temperature, external temperature (from a weather station), and the boiler firing request from the control system:

FIG. 5 shows the data captured over a data acquisition period.

Figure 7:
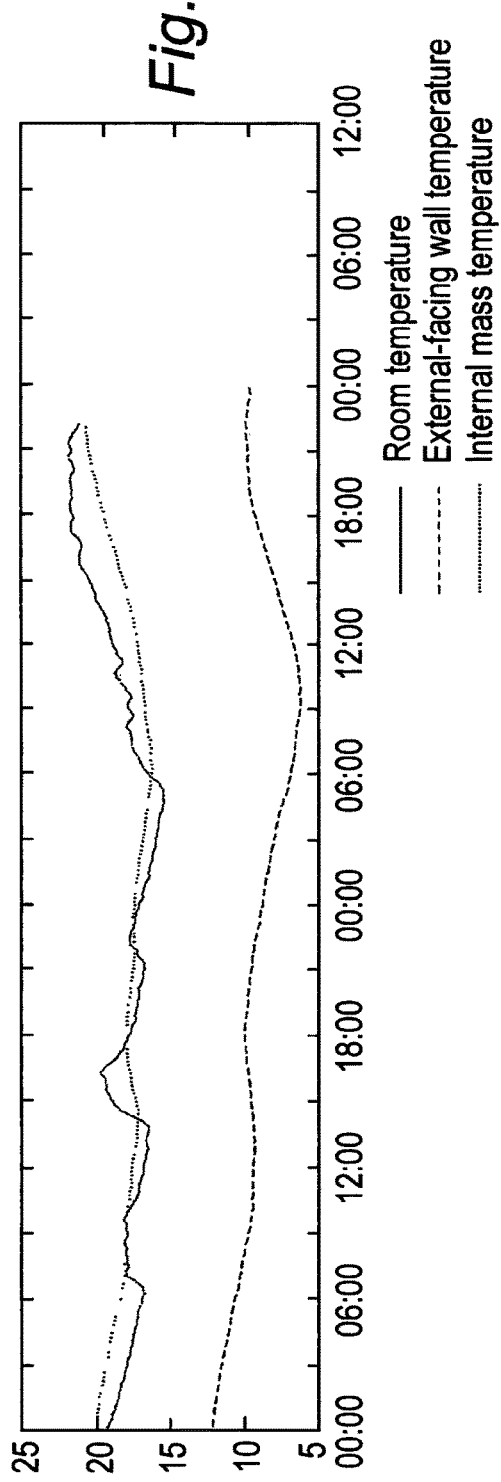
Figure 8:
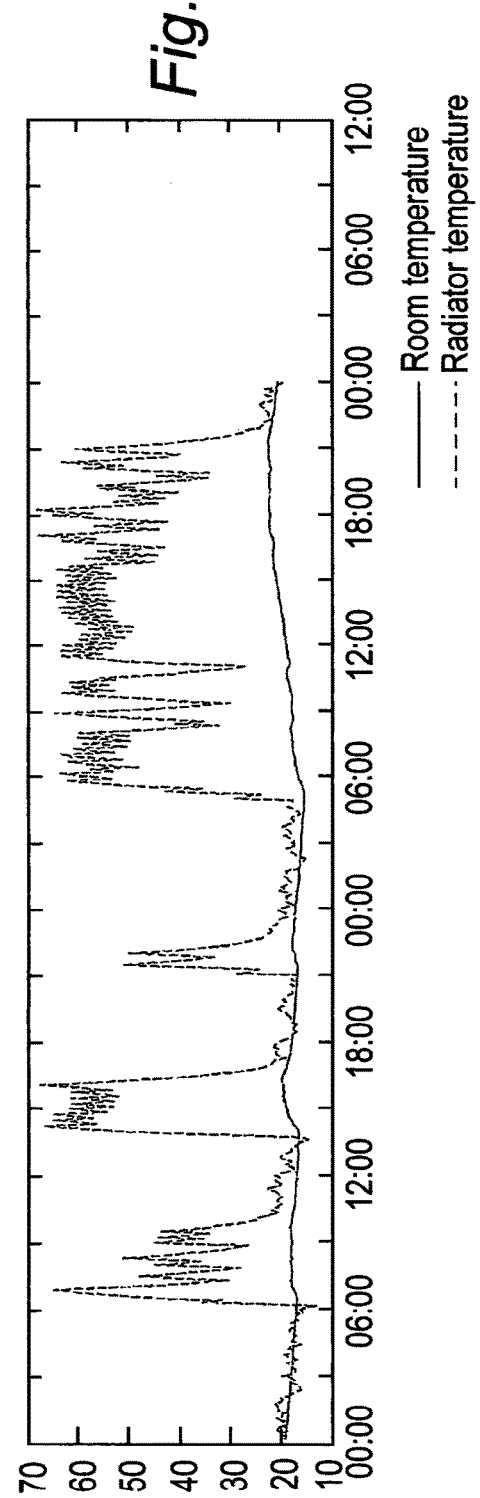
Figure 11H:
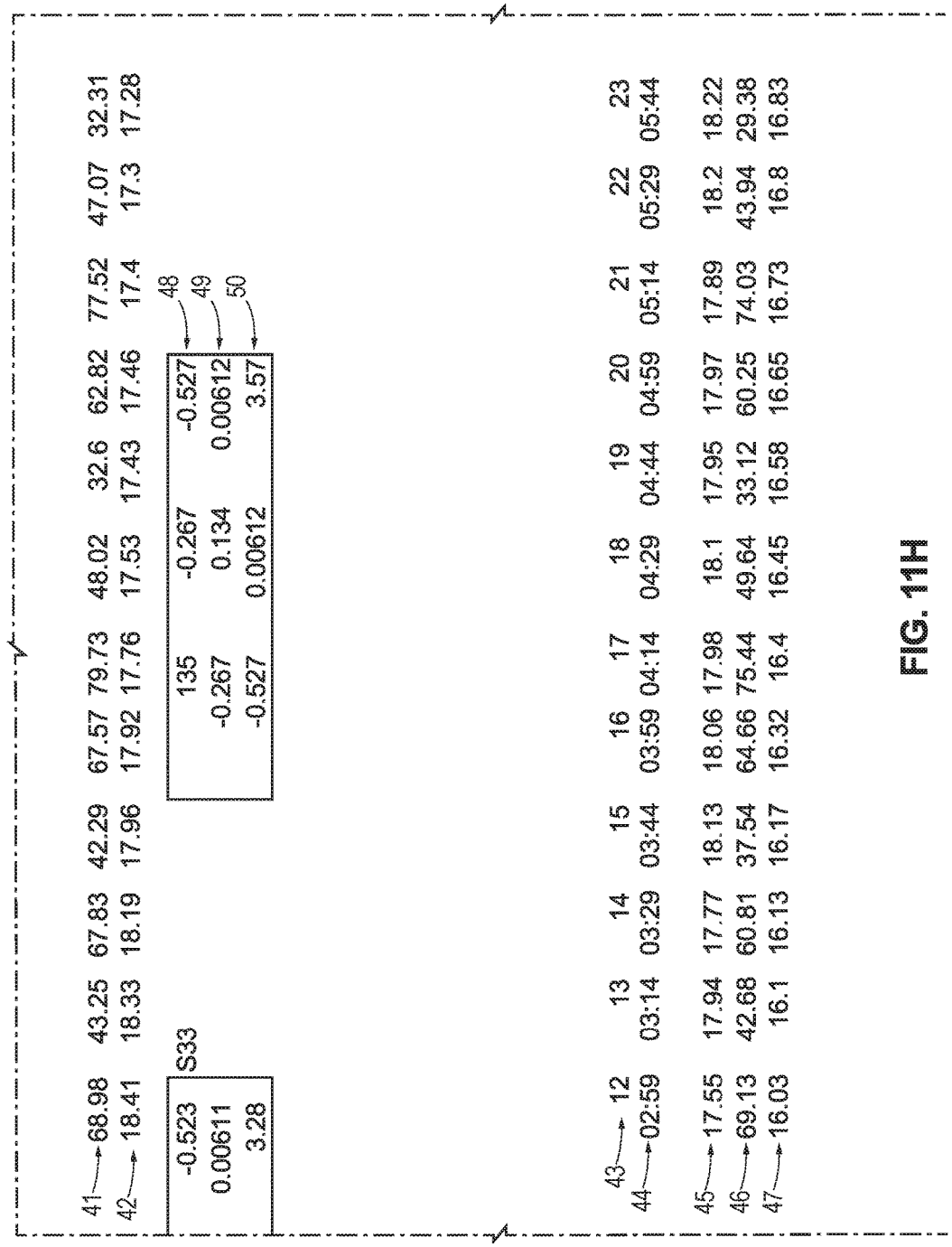
Figure 11K:
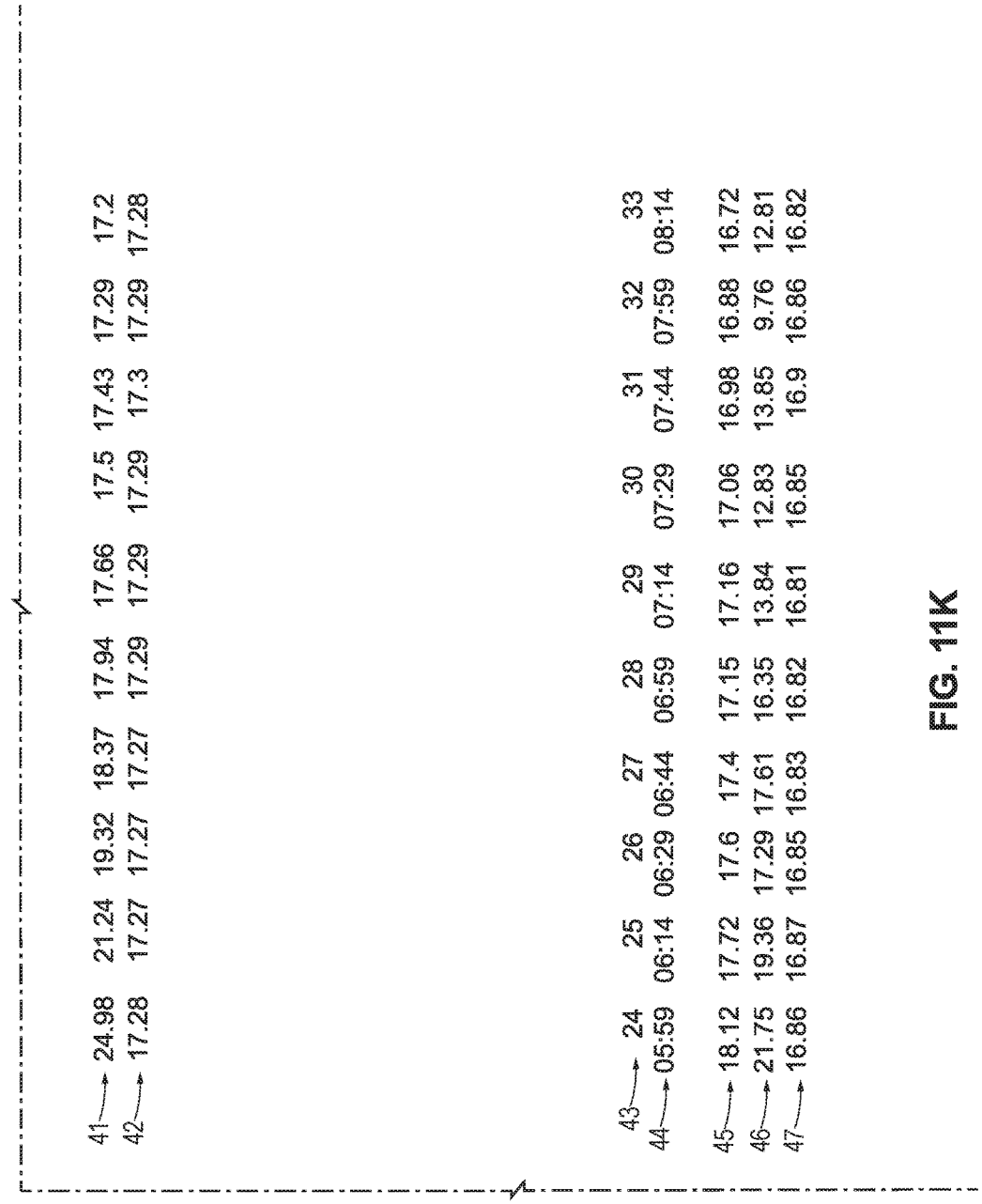
Figure 12:
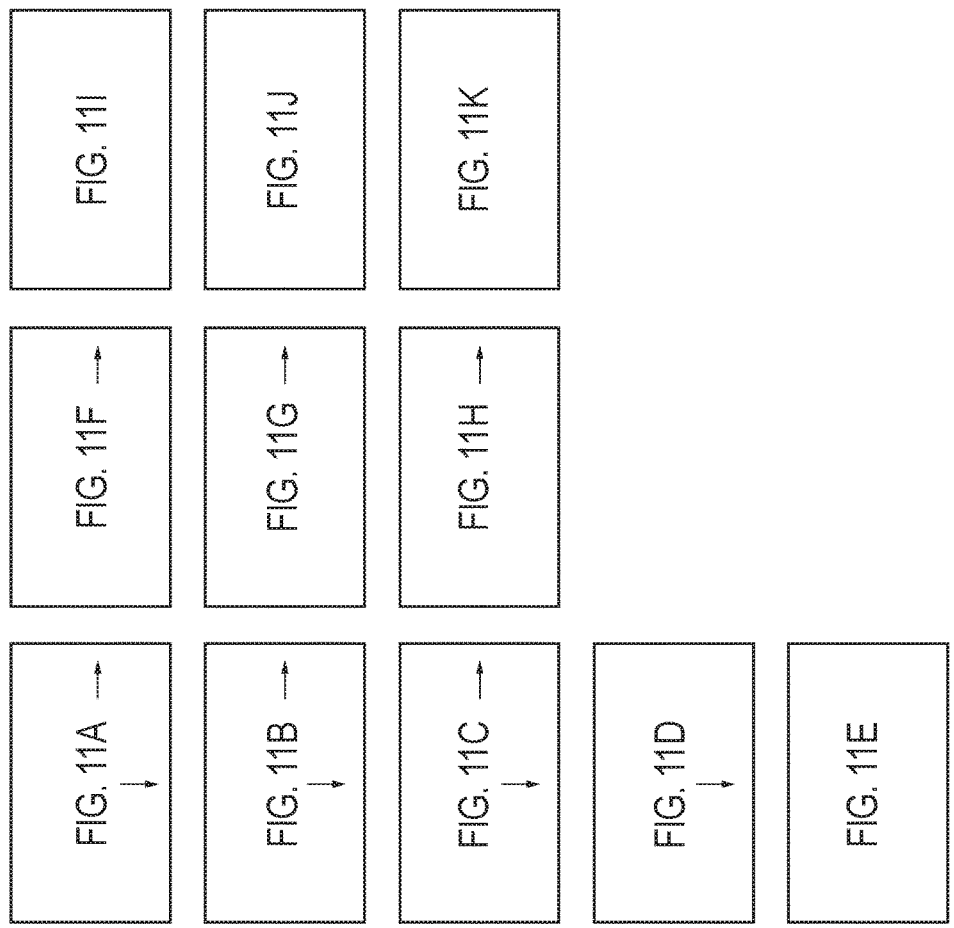
FIG. 12 is a diagram illustrating the relative positions of FIGS. 11A-11K in the corresponding spreadsheet.

We make an initial guess for the thermal parameters of the house (this is a different house model to that in the maths, with an additional term for the external-facing walls). r=[0.1 0.1 0.04 2.0 0.18 150 0.04 0.05];

We can make our first Gibbs step for X given r. FIG. 6 shows a detail of the room temperature trace with the forward-filtered temperature (solid line, higher) and the backward-filtered temperature (dashed line). The latter can be seen to follow the measurements a lot better:

Note that our state X contains hidden variables. FIG. 7 shows the inferred thermal mass and external wall temperatures:

and we also infer the radiator temperature, as shown in FIG. 8:

These states can provide additional insight about the house and how it responds to heat and how it can best be controlled.

The next step is to construct the matrix U and vector ρ from the sampled hidden temperature traces and their gradients.

In this case we calculate U as:

$$\begin{bmatrix} 3418450 & -1137119 & -123217 & 0 & 0 & 0 & 0 & 0 \\ -1137119 & 590349 & 30724 & 0 & 0 & 0 & 0 & 0 \\ -123217 & 30724 & 10093 & 0 & 0 & 0 & 0 & 0 \\ 0 & 0 & 0 & 12306 & 0 & -192 & 0 & 0 \\ 0 & 0 & 0 & 0 & 90838 & 0 & 0 & 0 \\ 0 & 0 & 0 & -192 & 0 & 6 & 0 & 0 \\ 0 & 0 & 0 & 0 & 0 & 0 & 5313138 & -3276258 \\ 0 & 0 & 0 & 0 & 0 & 0 & -3276258 & 3327858 \end{bmatrix}$$

(displaying numbers rounded) and ρ=[0.0650 0.1030 0.3164 2.5231 0.1874 146.5290 0.0329 0.0539]

Note the off-diagonal elements of the matrix U, indicating correlations between the parameters—this is an advantage of our approach.

We have a prior for r as a Gamma distribution with m=[3 3 2 4 2 4 2 2] and θ=[0.0500 0.0500 0.0400 0.6667 0.1800 50.0000 0.0400 0.0500] and using our rejection sampling method we come up with a new value of r as: [0.0662 0.1037 0.3341 2.5037 0.1869 147.7129 0.0307 0.0520]

This value is fairly similar to ρ—we have a decent amount of data and are not in conflict with the priors—and it is also fairly similar to the initial value of r, but we have taken a small step in the right direction. This is how the Gibbs sampling works, as a Markov Chain Monte Carlo method algorithm for making steps that sample from the right distribution.

Now we can use this value of r to resample X in turn. FIG. 9 shows a detail of the room temperature graph with forward-filtered and backward-sampled room temperature measurements, using this updated r. We can see that the forward filtered trace is now much closer to the measurements, indicating that the model is better (e.g. it naturally produces the right gradient for the heating period, rather than having to be constantly pulled down by the measurements).

After the next step
r=[0.0519 0.0816 0.3536 2.5443 0.1867 147.5935 0.0333 0.0552] again slightly updated, and after 30 iterations:

r=[0.0603 0.0969 0.6425 2.5737 0.2918 145.6909 0.0618 0.0823]

We can now use our learned house model to predict the room temperature over this period. The solid line in FIG. 10 shows our predicted room temperature trace solely using (a) the boiler heat request and (b) the external temperature.

It looks worse than previous traces, but all the previous graphs have used the actual room temperature measurements as an input; here everything about the house's response to heat input and external influences has come from our learned model.

The spreadsheet at the end of the text of this description sets out the data obtained in the process of another worked example. Since the number of samples k of the data acquisition period is large, certain rows are spread over several pages. The rows in question have been denoted by reference numerals 32-50 to enable the pages to be easily cross-referenced to each other.

From the present disclosure, many other modifications and variations will be apparent to persons skilled in the art. Such modifications and variations may involve other features which are already known in the art and which may be used instead of or in addition to features already disclosed herein. It should be understood that the scope of the disclosure of the present application includes any and every novel feature or combination of features disclosed herein either explicitly or implicitly and together with any such modification and variation, whether or not relating to the main inventive concepts disclosed herein and whether or not it mitigates any or all of the same technical problems as the main inventive concepts. The applicants hereby give notice that patent claims may be formulated to such features and/or combinations of such features during prosecution of the present application or of any further application derived or claiming priority therefrom.

Proposed Areas of Novelty

1. An effective and efficient method for learning the parameters of a model of a heating (or cooling) system given a block of data which may consist of temperature measurements, power measurements, weather information, and control signals.
2. A method as in paragraph 1 where the inference is carried out by Gibbs steps of forward-filtering-backward-sampling and then sampling from a multi-variate gamma-gauss distribution.
3. A method for incorporating a non-linear heating system (e.g. a boiler with a temperature cap or a heat pump) in the method of paragraph 1 by inferring the power it provides to the heat delivery system from the filtered model state.
4. The use of the method to separate the effect of thermal inertia from heat loss.
5. The use of the method to infer the influence of external conditions (such as temperature, solar irradiation etc.) on internal temperatures of the house.

6. The use of the learning process as part of an automated heating controls system, whereby a rolling buffer of data is maintained and periodically used to update the thermal parameters (starting with sensible defaults for the house/heating system type), thereby completing a fully automatic feedback loop.
7. The extension of the method in paragraph 1 and 3 to a storage heater by modifying the thermal model according to discharge vent position and inferring storage heater insulation levels with an additional Gibbs sampling step.
8. The application to controlling heat pumps, underfloor heating, multi-zone properties and hot water.
9. The use of the learned house model to provide insight to a householder, enabling feedback to improve heating management.
10. From paragraph 9, the use of the learned house model to provide predictions about temperature profiles and energy consumption that would result from choices of control settings in order to guide the user.
11. The use of the learned house model to detect in real time anomalies or faults in the house or heating system through behaviour that diverges from that expected from the model.
12. The use of the learned house model to provide quantitative advice on heat pump sizing and the choice of settings such as heat slope.
13. The use of the learned house model to provide timely advice to the user of storage heaters as to what settings they should choose given their future heat requirements.

APPENDIX

Glossary—List of Variables

We provide a table below of the variables used within this document.

| Symbol | Description | Example |
|---|---|---|
| $n_r$ | Number of thermal parameters characterising house model | 6 in the examples above |
| $n_m$ | Number of temperature measurements taken from heating system | Usually 1 (room temperature) but may be more (e.g. pipe temperatures) |
| $n_s$ | Number of temperatures characterising the hidden state x of the house | 3 in the examples above |
| $n_b$ | Number of independent energy inputs to the house model | Usually 1, but may be more (e.g. hybrid systems) |
| $n_f$ | Number of external influences on the house model | Usually 1 (external temperature), but may be more (e.g. solar irradiance factor) |
| r | Parameter vector ($n_r \times 1$), list of parameters characterising the thermal properties of the house. The purpose of this invention is to infer r. | Usually most components will be numbers in inverse-time units (e.g. 0.1 per hour), thus representing timescales, but the r param measuring energy input will have different units (e.g. may be degrees per hour). |
| $y_k$ | Measurement vector ($n_m \times 1$) at time index k (list of temperatures measured from the home) | Normally a single number but might include pipe temperatures, so e.g. vector of two temperatures. |
| $x_k$ | Hidden state vector ($n_s \times 1$) at time k, list of temperatures characterising the state of the model house. | Three temperatures: the room temperature, the temperature of the water in the heating system, and the temperature of the interior thermal mass of the house. |
| $A_d(r, t)$ | House evolution matrix ($n_s \times n_s$), continuous time. Always a function of r, may be time t dependent (but usually constant). | See Eqn 2 |
| $B_d(r, t)$ | Energy input influence matrix ($n_s \times n_b$), continuous time. Always a function of r, always time t dependent. | See Eqn 2. Multiplied by vector of energy inputs E ($n\_b \times 1$) |
| $F_d(r, t)$ | External influence matrix ($n_s \times n_f$), continuous time. Always a function of r, always time t dependent. | See Eqn 2 Multiplied by vector of external influences $T_E$ ($n\_b \times 1$) |
| $A_k(r)$ | House evolution matrix ($n_s \times n_s$), discrete time. Always a function of r, may be time k dependent (but usually constant). | See Eqn 2 & Eqn 4 |
| $B_k(r)$ | Influence vector ($n_s \times 1$), discrete time. Always a function of r, alway time k dependent. | See Eqn 2 & Eqn 4. Implicitly includes effect of energy inputs and external influence - not known a priori as exact energy inputs generally unknown |
| H | Measurement matrix ($n_m \times n_s$), defines $y_k = Hx_k$ (plus any noise). | Measuring room temperature from a three-state model: H = [100] |
| R | Measurement noise scale matrix ($n_s \times n_s$). | $1/\sigma^2$ where $\sigma$ is the standard deviation of the measurement noise. |
| Q | Process noise scale matrix ($n_m \times n_m$). | Diagonal matrix where each element is $1/\sigma^2$ where $\sigma$ is the standard deviation of the process noise in temperature at each step. |
| $T_{E,k}$ | Measured external influences on the house at time k. | Usually just the external temperature, but may also include solar irradiation, cloud cover, etc. |

| Symbol | Description | Example |
| --- | --- | --- |
| $P_k$ | Measured information about the control signals to the house's heating systems at time k. Usually of size ($n_b$ × 1). | Could be the boiler request signal (0 or 1). In some cases there might be multiple control signals that help inference of a single value of E. |
| $\mu_k$ | Inferred mean ($n_s$ × 1) of the probability distribution of the hidden state $x_k$. | See $x_k$ |
| $S_k$ | Inferred scale matrix $n_s$ × $n_s$ (i.e. inverse of the covariance matrix) of the probability distribution of the hidden state $x_k$. | |
| $E_k$ | Inferred power to the house $n_b$ × 1, as would be multiplied by $B_d$ to influence the house state. | Could be (inferred) actual firing of the boiler (so would be zero when the request signal is 1, because the boiler is maintaining maximum temperature), i.e. 0 or 1 for gas flame off or on. |
| $X_k$ | Sampled value of the hidden state vector ($n_s$ × 1) at time k, list of temperatures characterising the state of the model house. | As for $X_k$. The difference is that $X_k$ represents a single sampled value after the backwards-sampling step, rather than a random variable. |
| $D_k$ | Matrix $n_s$ × $n_r$ representing the linear relationship between the r parameter vector and the gradient in the hidden state vector x. | See Eqns 8 and 9 |
| U | Inferred scale matrix $n_r$ × $n_r$ (i.e. inverse of the covariance matrix) of the likelihood probability distribution of r from the backward-sampled state vectors over the time period. | See worked example. |
| $\rho$ | Inferred mean $n_r$ × 1 of the likelihood probability distribution of r from the backward-sampled state vectors over the time period. | See worked example. |
| $m_i$ | Gamma shape parameter for the prior of the ith r param (see Eqn 10), where i is 1 to $n_r$. | 2 to 4 (where higher means less confidence in typical scale value). |
| $\theta_i$ | Gamma scale parameter for the prior of the ith r param (see Eqn 10), where i is 1 to $n_r$. | Typical value (e.g. inverse-time constant) for that r param. |
| v | Mode of the posterior distribution of r, vector of size $n_r$ × 1. | Similar to r. |

The invention claimed is:

1. A method of obtaining thermal property data on thermal properties of a temperature controlled system which includes temperature control apparatus and controlling the temperature control apparatus based on the thermal property data, said data being suitable for use in predicting the temperature of at least part of the system, the method comprising the steps of:
  (a) monitoring the temperature of at least part of the system over a succession of portions or points of a data acquisition period and recording said temperature for each portion or point in an electronic memory;
  (b) determining heat transfer data for the period, said heat transfer data being indicative of the amount of heat energy supplied to, or removed from said part by the temperature control apparatus over the acquisition period;
  (c) determining the thermal property data from the recorded temperatures and heat transfer data, wherein the thermal property data are determined by a process of statistical inference; and
  (d) initiating, by a controller and based on the thermal property data, a control signal that controls the performance of the temperature control apparatus;
  wherein the process of statistical inference comprises the steps of:
  (e) sampling a set of possible thermal property data;
  (f) determining a likelihood value, indicative of the probability of the selected data being consistent with recorded temperatures; and
  (g) repeating steps (e) and (f) for other samples of possible thermal property data.

2. The method according to claim 1, in which the thermal property data is used in the control of the temperature control apparatus, by being fed into a thermal model for the temperature controlled system, from which the energy requirements needed for the temperature control apparatus to achieve a desired temperature of the temperature controlled system can be anticipated, wherein the energy requirements anticipated from the thermal model are used in determining an operating schedule for the temperature control apparatus, and the control signal is initiated based at least in part on the operating schedule.

3. The method according to claim 1, in which the temperature controlled system comprises at least one room, for example in a domestic dwelling or an office of an office block, the temperature control apparatus comprising a heating and/or cooling system for the room.

4. The method according to claim 3, in which the thermal properties, in respect of which said thermal property data are obtained, comprise any two or more of the heat capacities and thermal transfer properties of the room or of the heating and/or cooling system, the thermal transfer properties as between the room and the environment external to the room, or an arithmetic combination or function of said capacities and thermal transfer properties.

5. The method according to claim 3, in which said thermal properties further comprise the heat capacity and thermal transfer properties of a thermal mass of the room or a function of said properties, or arithmetic combination of the properties with one or more of the other thermal properties.

6. The method according to claim 5, in which the thermal property data further comprises a thermal capacity of the heating and/or cooling system combined with heat energy supplied to or removed from the room.

7. The method according to claim 1, in which the process of statistical inference is a process of Bayesian Inference.

8. The method according to claim 1, in which the process of statistical inference is a forward filtering backward sampling process.

9. The method according to claim 1, in which step (b), comprises monitoring control signals to the temperature control apparatus and calculating or estimating the heat transfer data from the data obtained by said monitoring.

10. The method according to claim 9, in which the temperature control apparatus transfers heat within the room by means of a circulating heat transfer medium, the determining of the heat transfer data additionally comprising determining the temperature(s) of the transfer medium at the output of the temperature control apparatus, by a process of statistical inference.

11. Assessment apparatus for performing the method in accordance with claim 1.

12. Assessment apparatus for obtaining thermal property data on thermal properties of a temperature controlled system which includes at least one temperature control apparatus and controlling the at least one temperature control apparatus based on the thermal property data, said data being suitable for use in predicting the temperature of at least part of the system, the apparatus for obtaining thermal property data comprising:
- at least one temperature sensor for monitoring the temperature of at least part of the system over a succession of portions or points of a data acquisition period;
- an electronic memory for storing said temperatures for each point or portion;
- a data processor arrangement operable to:
  - estimate heat supply/removal data for the period, said heat supply/removal data being indicative of the amount of heat energy supplied to or removed from said part by the temperature control apparatus during the period, and
  - determine the thermal property data from recorded temperatures and heat transfer data, wherein the data processor arrangement is operable to determine the thermal property data by a process of statistical inference; and
- a controller for the at least one temperature control apparatus configured to, based on the thermal property data, initiate a control signal that controls the performance of the at least one temperature control apparatus;

wherein the data processor arrangement is operable to determine the thermal property data by a process of statistical inference that comprises the steps of:
  (a) sampling a set of possible thermal property data;
  (b) determining a likelihood value, indicative of the probability of the selected data being consistent with recorded temperatures; and
  (c) repeating steps (a) and (b) for other samples of possible thermal property data.

13. The assessment apparatus of claim 12, wherein the at least one temperature control apparatus is for heating and/or cooling a room, wherein the electronic memory is arranged also to store said thermal property data and said data processor arrangement is also operable to calculate, for each portion of a control period, the heat energy to be transferred by the at least one temperature control apparatus for heating and/or cooling the room to meet one or more given conditions over the control period.

14. The assessment apparatus of claim 13, in which the control signal is configured to cause the at least one temperature control apparatus to perform such that the sum of the cost of supplying energy to the at least one temperature control apparatus for heating/cooling the room and a parameter representative of a predetermined acceptability of variations from a set print temperature is minimised.

15. The assessment apparatus of claim 13, in which the at least one temperature control apparatus comprises a heat pump or storage heater.

16. The method according to claim 1, in which there is provided the step of displaying said thermal property data, or data derived therefrom, said displayed data being such as to facilitate the effective control of the temperature control apparatus by a user.

17. The method according to claim 3, in which the temperature controlled system is represented as a physics model, relating heat supply/removal to temperature, and the process of statistical inference comprises running a Kalman filter forward in time, recording the mean and covariance value of each parameter and then backwards sampling in time using the recorded mean and covariance value.

18. A method of obtaining thermal property data on thermal properties of a temperature controlled system which includes temperature control apparatus and controlling the temperature control apparatus based on the thermal property data, said data being suitable for use in predicting the temperature of at least part of the system, the method comprising the steps of:
  (a) monitoring the temperature of at least part of the system over a succession of portions or points of a data acquisition period and recording said temperature for each portion or point in an electronic memory;
  (b) determining heat transfer data for the period, said heat transfer data being indicative of the amount of heat energy supplied to, or removed from said part by the temperature control apparatus over the acquisition period;
  (c) determining the thermal property data from the recorded temperatures and heat transfer data, wherein the thermal property data are determined by a process of statistical inference; and
  (d) initiating, by a controller and based on the thermal property data, a control signal that controls the performance of the temperature control apparatus, wherein the process of statistical inference is a forward filtering backward sampling process.

19. A method of obtaining thermal property data on thermal properties of a temperature controlled system which includes temperature control apparatus and controlling the temperature control apparatus based on the thermal property data, said data being suitable for use in predicting the temperature of at least part of the system, the method comprising the steps of:
  (a) monitoring the temperature of at least part of the system over a succession of portions or points of a data acquisition period and recording said temperature for each portion or point in an electronic memory;
  (b) determining heat transfer data for the period, said heat transfer data being indicative of the amount of heat energy supplied to, or removed from said part by the temperature control apparatus over the acquisition period;

(c) determining the thermal property data from the recorded temperatures and heat transfer data, wherein the thermal property data are determined by a process of statistical inference; and (d) initiating, by a controller and based on the thermal property data, a control signal that controls the performance of the temperature control apparatus, wherein the temperature controlled system comprises at least one room, for example in a domestic dwelling or an office of an office block, the temperature control apparatus comprising a heating and/or cooling system for the room, and wherein the temperature controlled system is represented as a physics model, relating heat supply/removal to temperature, and the process of statistical inference comprises running a Kalman filter forward in time, recording the mean and covariance value of each parameter and then backwards sampling in time using the recorded mean and covariance value.

* * * * *